(12) United States Patent
Yamaguchi

(10) Patent No.: US 6,446,893 B2
(45) Date of Patent: Sep. 10, 2002

(54) SPINNING REEL FOR FISHING

(75) Inventor: Akira Yamaguchi, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/725,684

(22) Filed: Nov. 30, 2000

(30) Foreign Application Priority Data

Nov. 30, 1999 (JP) .......................................... 11-340314
Nov. 30, 1999 (JP) .......................................... 11-340315
Nov. 30, 1999 (JP) .......................................... 11-340316

(51) Int. Cl.[7] .............................................. A01K 89/01
(52) U.S. Cl. ..................................................... 242/246
(58) Field of Search ................................. 242/246, 247, 242/295, 297, 298, 299

(56) References Cited

U.S. PATENT DOCUMENTS

| 5,195,698 A | * | 3/1993 | Kyoichi ....................... 242/246 |
| 5,240,202 A | * | 8/1993 | Park ............................ 242/246 |
| 5,350,132 A | * | 9/1994 | Hitomi ........................ 242/247 |
| 5,358,196 A | * | 10/1994 | Kawabe ...................... 242/246 |
| 5,547,140 A | * | 8/1996 | Kawabe et al. ............. 242/247 |
| 5,593,102 A | * | 1/1997 | Yamaguchi ................. 242/246 |
| 5,918,825 A | * | 7/1999 | Hirano et al. ............... 242/247 |
| 5,988,547 A | * | 11/1999 | Koelewyn ................... 242/246 |
| 6,139,278 A | * | 3/2000 | Tao ............................. 242/246 |
| 6,098,908 A | * | 8/2000 | Ng ............................... 242/246 |
| 6,123,280 A | * | 9/2000 | Yuen et al. .................. 242/247 |
| 6,273,351 B1 | * | 8/2001 | Tsukihiji et al. ............ 242/247 |

FOREIGN PATENT DOCUMENTS

JP          62-99975          6/1987

* cited by examiner

Primary Examiner—Emmanuel M. Marcelo
(74) Attorney, Agent, or Firm—Sughrue Mion, PLLC

(57) ABSTRACT

A spinning reel for fishing includes: a rotor (8) pivotally attached to a reel body (1a); a spool (10) attached to a spool shaft (9) supported by the reel body, capable of rotating with respect to the reel body, round which a fishline is wound by the rotation of the rotor; a drag mechanism for giving resistance to the rotation of the spool; a change-over mechanism for changing over an intensity of the drag force or changing over between a state of operation and a state of non-operation of the drag mechanism; and an operation member (5) for operating the change-over mechanism, wherein the operation member (5) is arranged at a position in a leg portion (1b) of the reel body (1a) attached to a fishing rod in such a manner that the operation member can be operated by a finger of an angler holding the fishing rod.

12 Claims, 28 Drawing Sheets

SPINNING REEL FOR FISHING

BACKGROUND OF THE INVENTION

1. Technical Field

The present invention relates to a spinning reel for fishing.

2. Related Art

In general, in a spinning reel for fishing, there is provided an anti-reverse for preventing a rotor from rotating in the fishline drawing direction, that is, there is provided an anti-reverse for preventing a rotor from rotating in the reverse direction. When a change-over mechanism is operated, this anti-reverse can be changed over between an operating state in which the rotor anti-reverse is turned on and a non-operating state in which the rotor anti-reverse is turned off.

In this connection, in this spinning reel for fishing, in order to catch a fish, which has already been caught by a hook while swimming in water, this spinning reel for fishing is sometimes used in a state in which the anti-reverse is turned off, that is, this spinning reel for fishing is sometimes used in a state in which the rotor can be reversed. However, in this case, the following problems may be encountered. When the fish which has been caught by the hook swims to the offing or the bottom of the sea, the handle or the rotor are reversed at high speed. Therefore, it is impossible for the angler to immediately conduct a fishline winding action. Further, when the fish has stopped running in water, the rotor overruns and a phenomenon of backlash is caused.

In order to solve the above problems, there is provided a spinning reel for fishing having a brake mechanism for giving a brake force to the reverse rotation of the rotor. This brake mechanism includes: a brake plate rotating together with the reverse rotation of the rotor; and a brake lever, which is arranged at the leg section of the reel body, for giving a brake force to the brake plate. When the brake lever is operated, a predetermined pushing force is given to the brake plate, so that the rotor can be given a brake force when it is reversed. When the above brake mechanism is used, it is possible for an angler to control the reverse rotation of the rotor according to the circumstances of fishing such as a type of the fish or a fight with the fish. Therefore, the angler can positively get the fish which has been caught by the hook.

Also, there is provided a spinning reel for fishing having a drag mechanism which allows rotation of the spool in the fishline drawing direction while the spool is being given a brake force. When this drag mechanism is used, even if the rotor is prevented from being reversed by the above anti-reverse, it is possible to cope with the circumstances in which the fish suddenly pulls the fishline by adjusting torque of the spool. That is, when drag is fully utilized so that a force given to the fishline can be removed by the rotation of the spool and the fishline can be drawn out from the spool, it is possible to prevent the fishline, which is directly connected with the hook, from cutting and also it is possible to prevent the fish body from being damaged.

For example, Japanese Unexamined Utility Model Publication No. 62-99975 discloses a change-over mechanism for changing over a state of operation of the drag mechanism. This change-over mechanism changes over the drag mechanism between a drag state in which the spool is given a rotational resistance (brake force) and a free state in which the spool is given no rotational resistance (brake force). The change-over mechanism includes an operating section for changing over between the above two states. When the handle is rotated, the operating section is activated being linked with the rotation of the handle. Therefore, the drag mechanism is changed over to the drag state.

Accordingly, when this change-over mechanism is used, fishing can be smoothly conducted as follows. An angler waits for a bite in a free state. When the angler detects a bite, he changes the drag to an operation state. Then, a fish can eat the bait smoothly, and the angler can take the fish smoothly.

When the drag mechanism is used, it is difficult for angler to change over the drag force given to the spool while the drag operation is being conducted, that is, it is difficult to linearly adjust a brake force like a lever brake. Accordingly, when the intensity of the drag force is too low, the spool is rotated by a weak force so that the fishline is drawn out. Therefore, it is difficult to let the fish come near the angler. On the contrary, when the intensity of the drag force is too strong, the fish suddenly pulls the fishline, which ends up in a break of the fishline or damage in the fish body.

In the change-over mechanism disclosed in the above utility model publication, when the handle is rotated, the drag mechanism is returned to the drag state. Therefore, when it is necessary for the angler to change over immediately, the drag mechanism is delayed when it returns to the drag state. Therefore, the rotor is energetically reversed. As a result, backlash of the fishline tends to be caused.

Further, according to the art disclosed in the above utility model publication, the following problems may be encountered. In the above technique, the operating section for operating an operation state of the drag mechanism is arranged on the rear side of the reel body. Therefore, when the operation state of the drag mechanism is changed over while the angler is holding the fishing rod, it is necessary for the angler to operate the operating section with a hand opposite to the hand holding the fishing rod. Therefore, it is troublesome for him to conduct a change-over operation of the drag. Accordingly, it is impossible to quickly change over the drag.

SUMMARY OF THE INVENTION

The present invention has been accomplished to solve the above problems. It is an object of the present invention to provide a spinning reel for fishing characterized in that: it is possible to simply and smoothly change over the states of rotation of the rotor and the spool; and the fishline can be quickly and smoothly drawn out even when it is suddenly pulled by a fish.

In order to solve the above problems, the present invention provides a spinning reel for fishing comprising:

a reel body defining a leg portion attachable to a fishing rod;

a rotor rotatably supported on the reel body;

a spool rotatably attached to the reel body, a fishline being wound around the spool by rotating the rotor;

a first drag mechanism which applies a first resistance to a rotation of the spool;

a change-over mechanism changing over between a state of operation and a state of non-operation of the first drag mechanism; and an operation member, which operates the change-over mechanism, attached to the leg portion so that the operation member can be operated by a finger of an hand holding the fishing rod.

In order to solve the above problems, the present invention provides a spinning reel for fishing comprising:

a reel body;

a rotor rotatably supported on the reel body;

a spool rotatably attached to the reel body, a fishline being wound around the spool by rotating the rotor;

a drag mechanism which applies a resistance to a rotation of the spool;

a change-over mechanism changing over between a state of operation and a state of non-operation of the drag mechanism;

a brake mechanism which applies a braking force to a reverse rotation of the rotor;

an anti-reverse mechanism which prevents the reverse rotation of the rotor;

an operation member, which operates the brake mechanism and the anti-reverse mechanism, attached to the reel body; and an change-over mechanism operating member, which operates the change-over mechanism, provided at the reel body and separated from the operation member.

The present invention has been accomplished to solve the above problems. It is an object of the present invention to provide a spinning reel for fishing characterized in that: it is possible to simply and smoothly change over the states of rotation of the rotor and the spool; and the fishline can be quickly and smoothly drawn out even when it is suddenly pulled by a fish.

DETAILED DESCRIPTION OF PREFERRED EMBODIMENT

Referring to the appended drawings, an embodiment of the present invention will be explained below.

First Embodiment

Figure 1:
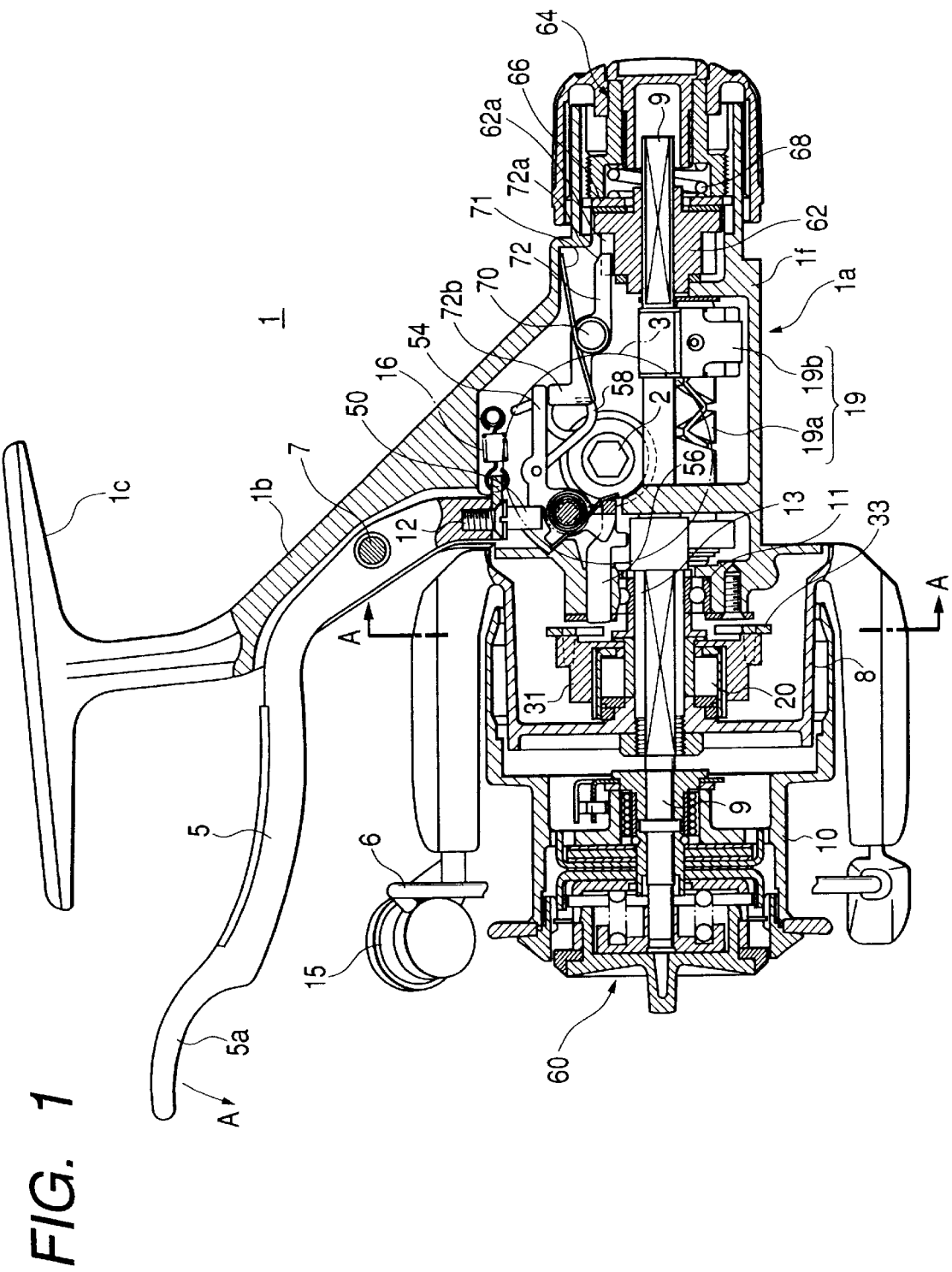
FIG. 1 is a cross-sectional view showing a spinning reel of the first embodiment of the present invention.
Figure 10:
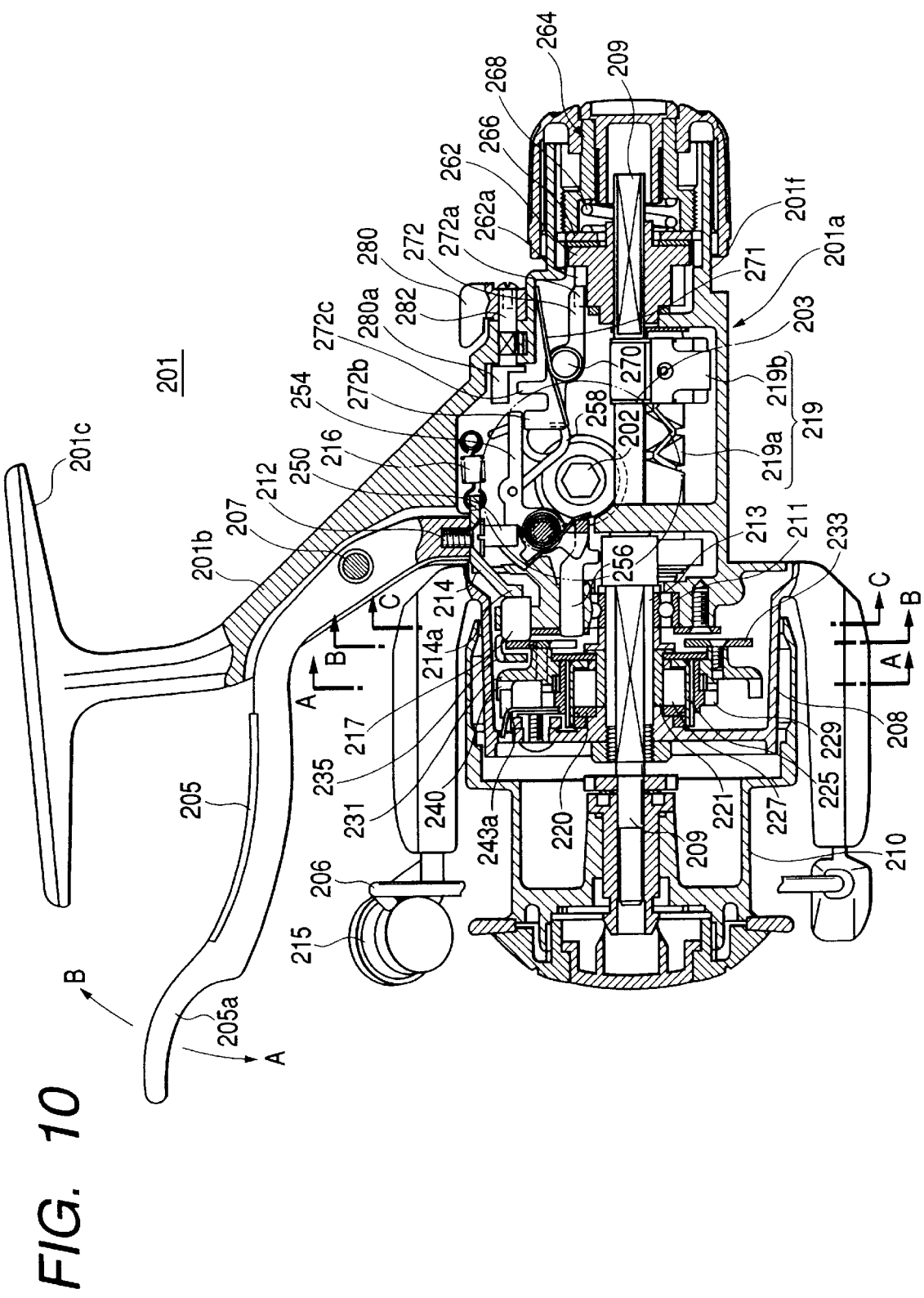
FIG. 10 is a cross-sectional view showing a spinning reel of the fifth embodiment of the present invention.

FIGS. 1 to 4 and FIG. 8 are views showing the first embodiment of the present invention. As shown in FIGS. 1 and 10, the spinning reel 1 for fishing of this embodiment includes: a reel body 1a; a leg portion 1b extending from the reel body 1a; and a fishing rod attaching portion 1c formed at an end section of the leg portion 1b, attached to a fishing rod not shown in the drawing. In the reel body 1a, a handle shaft 2 is pivotally provided. The handle not shown is fixed to an end section of the handle shaft 2 protruding from the reel body 1a.

A drive gear 3 is attached to the handle shaft 2. This drive gear 3 is engaged with a pinion gear 13. The pinion gear 13 is arranged in a direction perpendicular to the handle shaft 2 and pivotally supported on a bearing 11. A rotor 8 having a bail 6 and a fishline guide device 15 is integrally attached to an end portion of the pinion gear 13.

A spool shaft 9, which can be slid in a direction perpendicular to the handle shaft 2 and pivotally supported, is inserted into the pinion gear 13. A spool 10 round which the fishline is wound is fixed to an end section of the spool shaft 9. In this case, the spool 10 is fixed to the spool shaft 9 incapable of rotating when the well known front drag 60 is tightly fastened, wherein the spool 10 can not be rotated with respect to the spool shaft 9. That is, the spool 10 can be rotated integrally with the spool shaft 9.

The oscillating mechanism 19 is engaged with the drive gear 3. This oscillating mechanism 19 includes: a worm shaft 19a engaged and rotated with the drive gear 3; and a slider 19b engaged with a groove of the worm shaft 19a, wherein the slider 19b can not be moved with respect to the spool shaft 9 in the axial direction. When the handle shaft 2 is rotated by the rotation of the handle 60, the spool shaft 9 is reciprocated in the axial direction.

In the above structure, when the handle is rotated so as to rotate the handle shaft 2, the spool 10 attached to the spool shaft 9 via the oscillating mechanism 19 is reciprocated back and forth, and the rotor 8 is rotated via the drive gear 3 and the pinion gear 13. Accordingly, the fishline is uniformly wound round the spool 10 via the fishline guide device 15.

The reel body 1a includes an anti-reverse mechanism for preventing the reverse rotation of the rotor 8. This mechanism is operated by the operation lever 5 which is an operation member pivotally attached to the leg portion 1b via the support shaft 7. Specifically, when the operation lever 5 is pushed down in direction A from the initial position shown in FIG. 1, the anti-reverse mechanism is exerted. An operation section 5a, at which a finger is hooked, is provided at one end portion of the operation lever 5. This operation portion 5a is arranged at a position at which the operation portion 5a can be operated with a finger of a hand holding the fishing rod. Between the operation lever 5 and the reel body 1a, there is provided a tension spring 16 for urging the operation lever 5 toward the initial position at all times. A brake rotor 31 is attached to the pinion gear 13 via the one-way clutch 20. The ring-shaped anti-reverse plate 33 is attached onto a surface of the brake rotor 31 with the screw 90.

Figure 8:
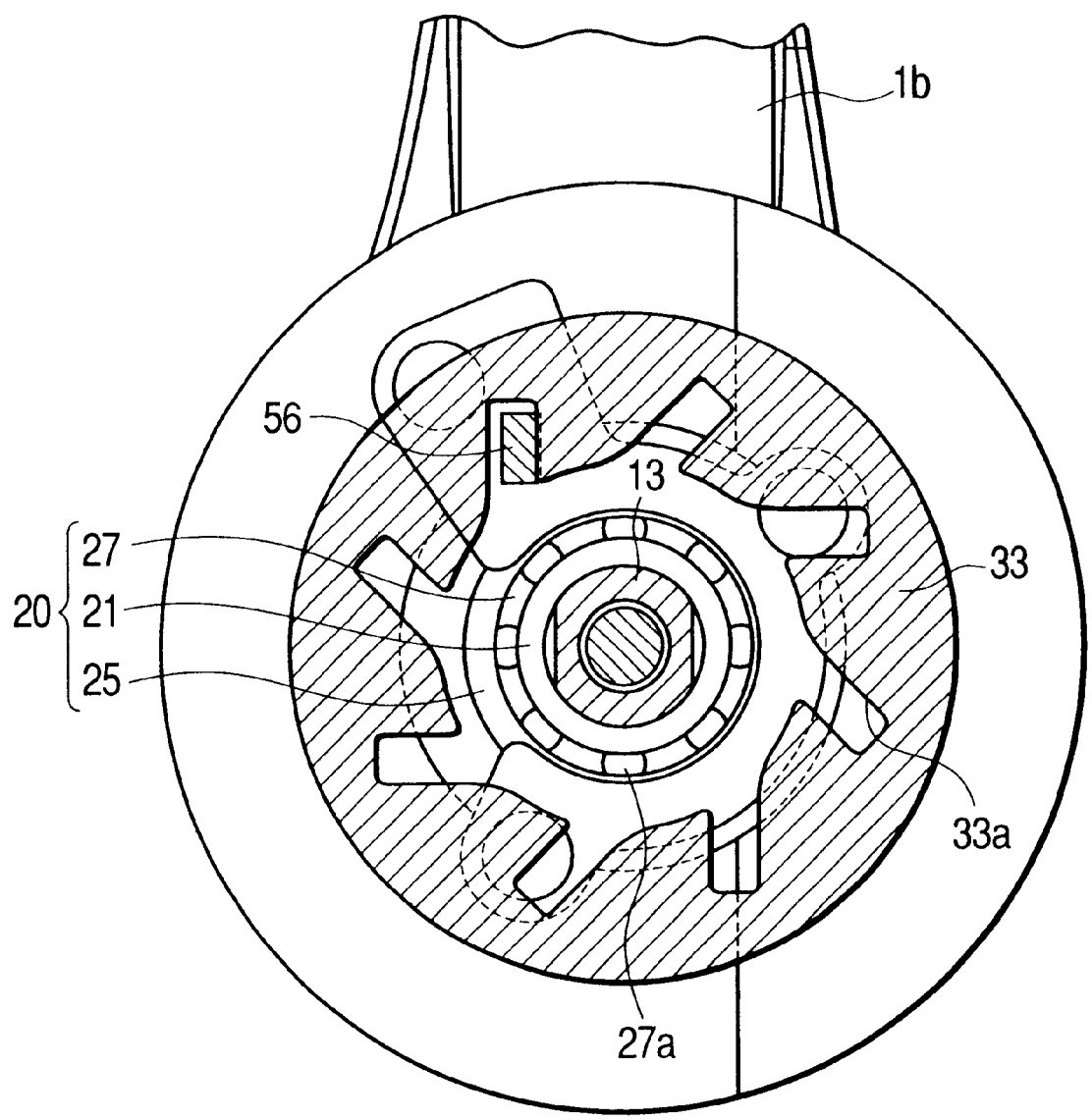
FIG. 8 is a cross-sectional view taken on line A—A in FIG. 1.

The one-way clutch 20 includes: an inner ring 21 engaged with the pinion gear 13 so that the inner ring 21 can not be rotated with respect to the pinion gear 13; a retainer 27 arranged outside the inner ring 21; and outer ring 25 arranged outside the retainer 27. The brake rotor 31 is engaged with an outer circumference of the outer ring 25 being incapable of rotating. As shown in FIG. 8, the retainer 27 retains a plurality of rolling members 27a. Each rolling member 27a is urged in one direction by a spring member provided in the retainer 27. On the inner circumferential face of the outer ring 25, there are provided a free rotating region in which each rolling member 27a can be freely rotated and a wedge region in which each rolling member 27a can not be rotated. The one-way clutch 20 composed as described above is operated as follows. When the inner ring 21 is normally rotated together with the pinion gear 13, that is, when the rotor 8 is rotated in the direction of winding the fishline, the rolling members 27a of the retainer 27 are located in the free rotating region of the outer ring 25, so that the torque of the inner ring 21 can not be transmitted to the outer ring 25. However, when the inner ring 21 is reversed together with the pinion gear 13, that is, when the rotor 8 is rotated in the direction of drawing out the fishline, the rolling members 27a of the retainer 27 are located in the wedge region of the outer ring 25, so that the torque of the inner ring 21 can be transmitted to the outer ring 25.

According to the above connecting structure in which the pinion gear 13 and the brake rotor 31 are connected with each other via the one-way clutch 20, only when the pinion gear 13 is reversed, the brake rotor 31 and the anti-reverse plate 33 are directly connected with the pinion gear 13 (rotor 8) via the one-way clutch 20 and rotated integrally with the rotor 8.

Figure 2:
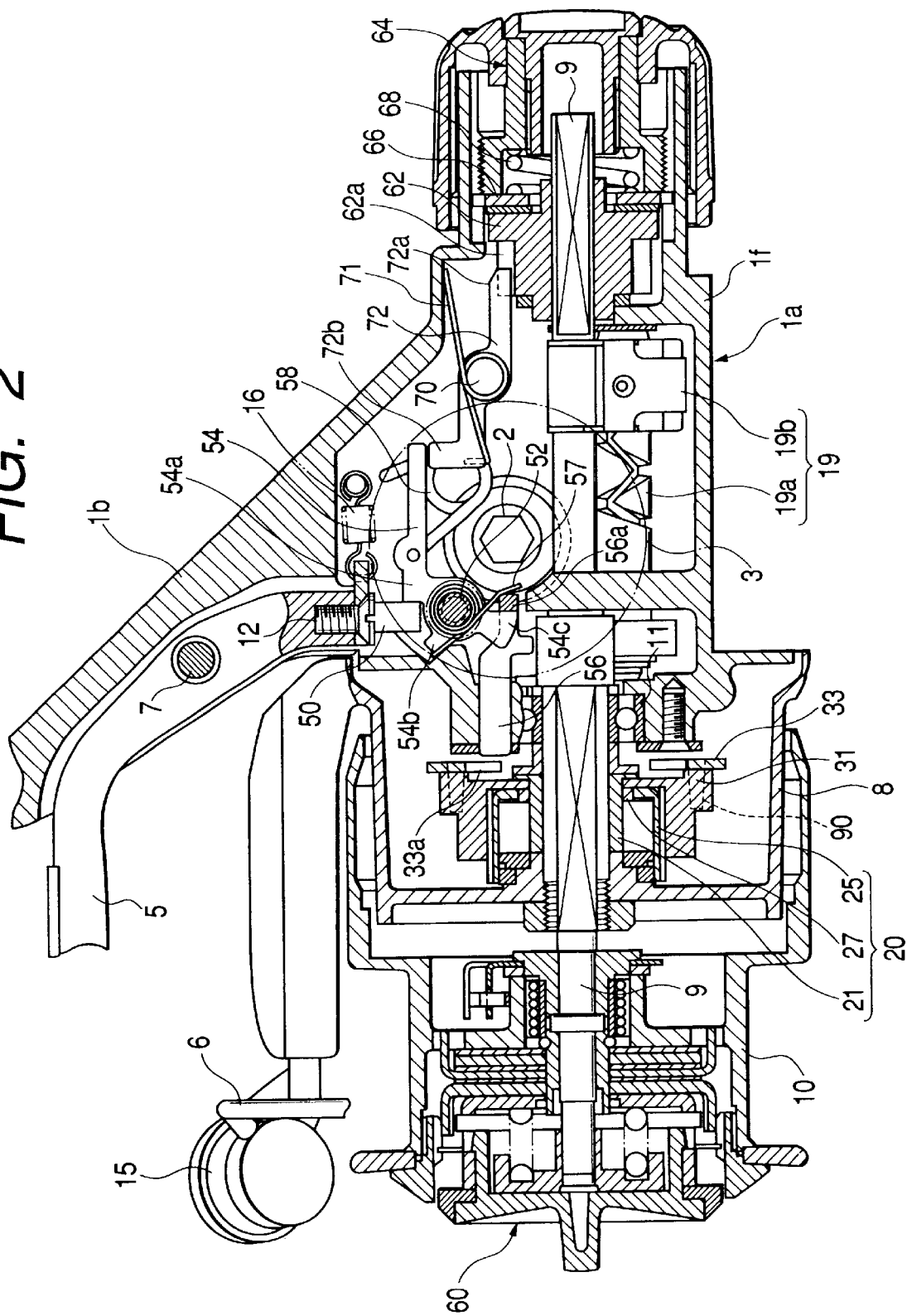
FIG. 2 is an enlarged cross-sectional view showing the spinning reel of FIG. 1.

As shown in the enlarged view of FIG. 2, the anti-reverse for preventing the reverse rotation of the rotor 8 includes: an operating member 50 protruding from the other end section of the operation lever 5; a control cam 54 pivotally supported by a support shaft 52 and rotated by the operating member 50; an engaging claw 56 movably held by the frame 1f of the reel body 1a and moved by the rotation of the control cam 54 toward the anti-reverse plate 33 of the controlling body 33; and a plurality of engaging grooves 33a formed on the inner circumferential face of the anti-reverse plate 33 and engaged with the engaging claw 56. The control cam 54 includes: a first and a second contacting section 54a, 54b coming into contact with the operating member 50; and a third contacting section 54c coming into contact with the engaging claw 56. The operating member 50 is located between the first 54a and the second contacting section 54b. The third contacting section 54c comes into contact with the protrusion 56a protruding from the end section of the engaging claw 56 to the side. The control cam 54 is urged in the rotational direction at all times by the straddled spring 58 arranged between the control cam 54 and the reel body 1a. The engaging claw 56 is urged in the direction so that the engaging claw 56 can be engaged with the engaging groove 33a of the anti-reverse plate 33B by the spring 57 wound round the support shaft 52.

In the above structure, in the case where the operation lever 5 is located at the initial position shown in FIG. 1, the first contacting section 54a of the control cam 54 comes into contact with the operation body 50 by an urging force of the straddled spring 58. In this case, the urging force of the straddled spring 58 acts in a direction so that the control cam 54 can be rotated counterclockwise in the drawing. At the same time, the third contacting section 54c coming into contact with the protrusion 56a of the engaging claw 56 resists an urging force of the spring 57, and the engaging claw 56 is separated from the anti-reverse plate 33B. When the operation lever 5 is pushed down from the initial position in direction A, the operating member 50 resists an urging force of the straddled spring 58, and the control cam 54 is rotated clockwise in the drawing. At this time, the straddled spring 58 is oscillated in accordance with the rotation of the control cam 54. When the straddled spring 58 exceeds its dead point, the straddled spring 58 gives an urging force to the control cam 54 in a direction so that the control cam 54 can be rotated clockwise. Accordingly, after that, the control cam 54 is rotated clockwise by not the operating member 50 but the urging force of the straddled spring 58. Due to the foregoing, the first contacting section 54a is separated from the operating member 50, while the engaging claw 56 coming into contact with the third contacting section 54c is moved toward the anti-reverse plate 33. Then, the engaging claw 56 is engaged with the engaging groove 33a of the anti-reverse plate 33. When the second contacting section 54b comes into contact with the operating member 50, the control cam 54 stops rotating. That is, the engagement of the engaging groove 33a with the engaging claw 56 is kept, and the operation lever 5 is kept at the rotor anti-reverse position that the operation lever 5 is pushed down in the direction A.

In the spinning reel 1 of this embodiment, there is provided a rear drag mechanism of the rear drag type in which the spool 10 is allowed to rotate in the fishline drawing direction, that is, the torque of the spool is controlled, while the spool 10 is being given a brake force. As shown in FIGS. 1 and 2, this drag mechanism includes:

a substantially cylindrical press contact member 62 attached to the spool shaft 9 and contacted with the frame 1f of the reel body 1a with pressure; a drag adjusting knob 64 arranged at the rear of the reel body 1a and screwed to the frame 1f of the reel body 1a; a plurality of frictional plates 66 arranged between the press contact member 62 and the drag adjusting knob 64; and a compression spring 68 interposed between the frictional plate 66 and the drag adjusting knob 64. In this case, the press contact member 62 is attached to the spool shaft 9 in such a manner that the press contact member 62 can not be rotated with respect to the spool shaft 9, that is, the press contact member 62 is rotated integrally with the spool shaft 9. The press contact member 62 can be moved in the axial direction with respect to the spool shaft 9. On the outer circumferential face of the press contact member 62, there are provided a plurality of engaging grooves 62a engaged with the engaging member 72 of the change-over mechanism described later.

In the above drag mechanism, the drag adjusting screw 64 is fastened while resisting an urging force of the spring 68, that is, the drag adjusting screw 64 is screwed into the frame 1f. Then, the press contact member 62 comes into pressure contact with the frame 1f of the reel body 1a via the frictional plate 66 by the urging force corresponding to the fastening force, so that the rotation of the spool shaft 9 can be restricted. Accordingly, the rotation of the spool shaft 10 rotating integrally with the spool shaft 9 can be restricted. When the drag adjusting knob 64 is loosened, the rotation of the spool shaft 9 can be allowed, that is, the rotation of the spool 10 can be allowed according to the looseness of the drag adjusting knob 64.

In the spinning reel 1 of this embodiment, there is provided a change-over mechanism for changing over a state of operation of the above rear drag mechanism. This change-over mechanism is operated by the operation lever 5. This change-over mechanism changes over between a drag state in which the rear drag mechanism can give a resistance force (brake force) to the rotation of the spool 10 and a non-drag state in which the rotation of the spool 10 is prevented so that the drag function can not be exerted.

Specifically, the change-over mechanism is provided with an engaging member 72 pivotally attached to a support shaft 70. This engaging member 72 has an engaging section 72a engaged with the engaging groove 62a of the press contact member 62 composing the rear drag mechanism. The engaging member 72 is urged at all times by the spring 71 wound round the support shaft 70 in a rotational direction so that the engaging section 72a can be engaged with the engaging groove 62a. On the opposite side to the engaging section 72a with respect to the support shaft 70, the engaging member 72 includes: a contacting section 72b capable of contacting with the control cam 54 composing the anti-reverse mechanism.

Operation of the above spinning reel 1 will be explained as follows.

Figure 3:
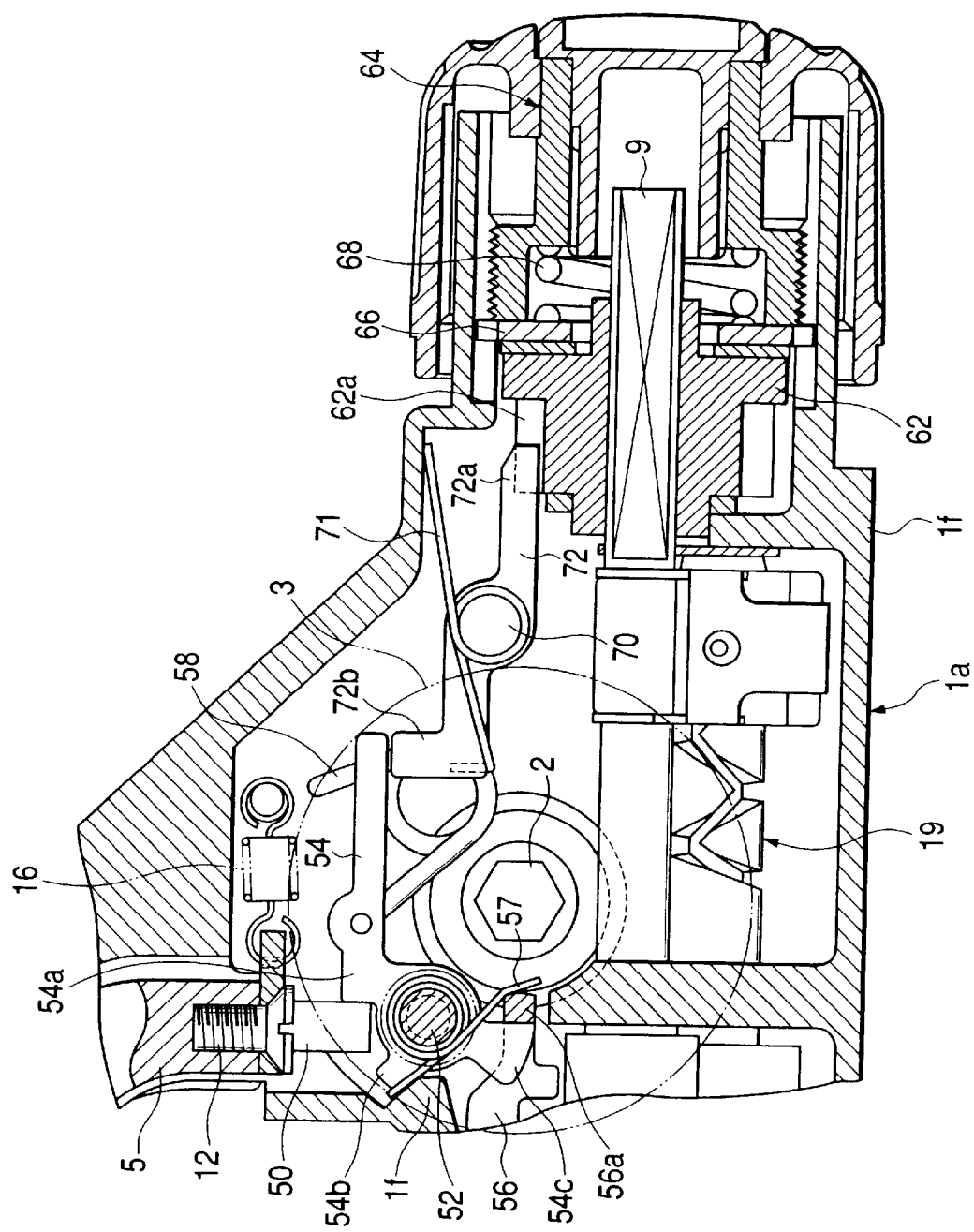
FIG. 3 is a cross-sectional view showing a primary portion of a state in which an operation lever is held at the initial position.

When the operation lever 5 is kept at the initial position as shown in FIGS. 1, 2 and 3, since the control am 54 is urged by the straddled spring 58, its first contacting section 54a comes into contact with the operating member 50, and the control cam 54 does not give a force to the first contacting section 72b of the engaging ember 72 for rotating. Therefore, the engaging member 72 can not rotate the control cam 54. Accordingly, the engaging section 72a of the engaging member 72 is kept in a state in which the engaging section 72a of the engaging member 72 is engaged with the engaging groove 62a of the press contact member 62 composing the rear drag mechanism by an urging force of the spring 71. Accordingly, the rotation of the press contact member 62 is prevented, and the rotation of the spool shaft 9 engaged with the press contact section 62 is restricted. That is, the rotation of the spool 10, which is attached to the spool shaft 9 being incapable of rotating, is prevented. In this way, the device is set in the non-drag state in which the drag function is not exerted.

When the pinion gear 13 is normally rotated via the handle in the above state, the rotor 8 attached to the pinion gear 13 is also normally rotated being integrated with the pinion gear 13, that is, the rotor 8 attached to the pinion gear 13 is rotated in the fishline winding direction. At this time, the brake rotor 31 is not rotated by above-mentioned connecting action of the one-way clutch 20 at this time.

When the operation lever 5 is being kept at the initial position, the rotor 8 attached to the pinion gear 13 is reversed integrally with the pinion gear 13, that is, the rotor 8 attached to the pinion gear 13 is rotated in the fishline drawing direction. At this time, the brake rotor 31 is reversed together with the rotor 8 by above-mentioned connecting action of the one-way clutch 20.

Figure 4:
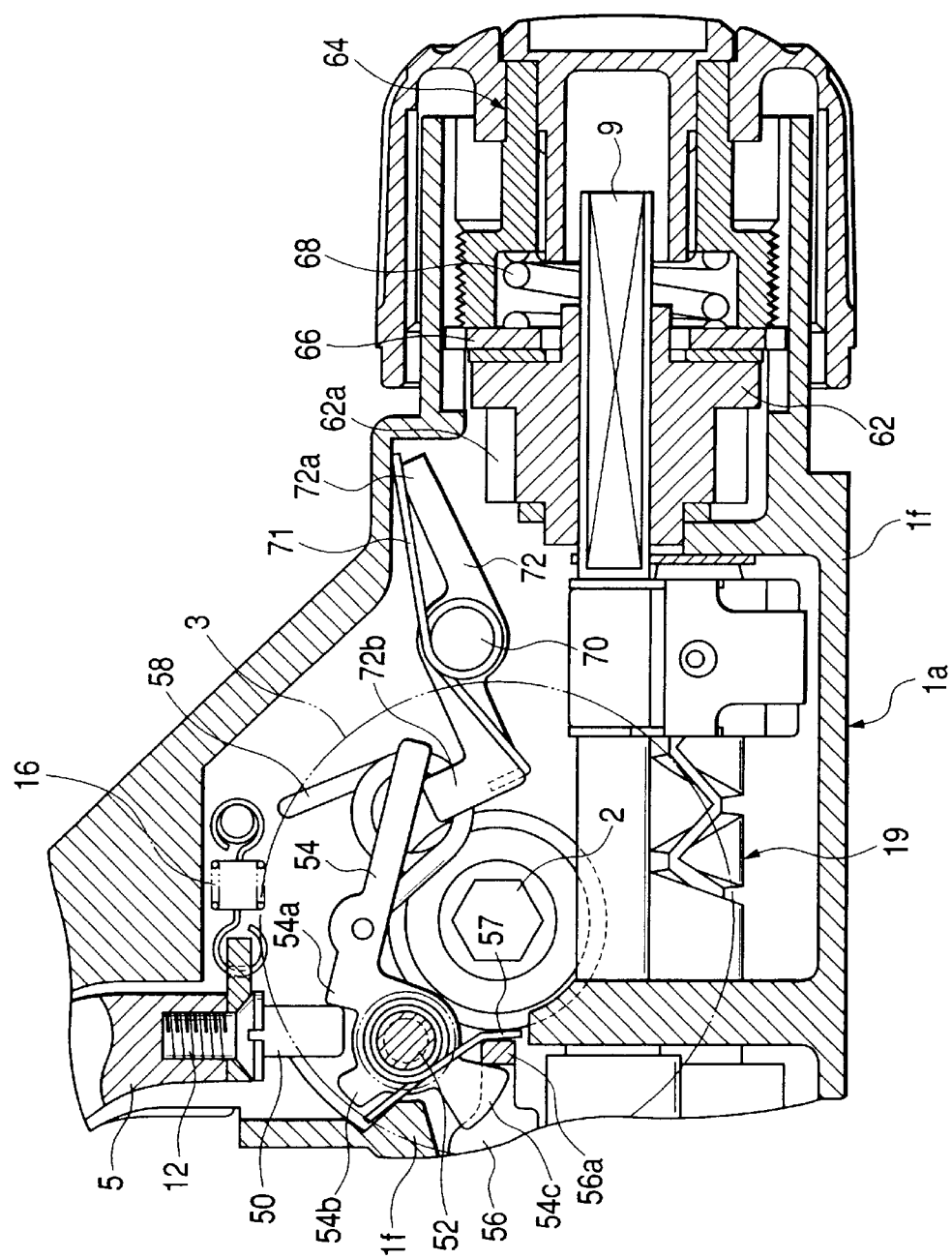
FIG. 4 is a cross-sectional view showing a primary portion of a state in which an operation lever is pushed down.

When the operation lever 5 is pushed down in direction A as shown in FIG. 4, the control cam 54 is rotated clockwise in the drawing via the operating member 50. Due to the foregoing, the engaging claw 56 coming into contact with the third contacting section 54c is moved toward the anti-reverse plate 33, and the engaging claw 56 is engaged with the engaging groove 33a of the anti-reverse plate 33, so that the brake rotor 31 can be prevented from rotating. Even if the pinion gear 13 is going to be reversed by the handle under the above condition, since the brake rotor 31, which is directly connected with the pinion gear 13 via the one-way clutch 20, is prevented from rotating, the pinion gear 13 can not be reversed, that is, the rotor 8 can not be reversed. Of course, when the pinion gear 13 is normally rotated under the above condition, the brake rotor 31 and the pinion gear 13, which is directly connected with each other via the one-way clutch 20, can be released from each other. Therefore, the rotor 8 can be normally rotated.

As shown in FIG. 4, the control cam 54 rotating according to the operation of pushing down the operation lever 5 comes into contact with the first contacting section 72b of the engaging member 72 and rotates the engaging member 72 counterclockwise in the drawing, so that engagement of the engaging section 72a with the engaging groove 62a can be released. Accordingly, the press contact member 62, spool shaft 9 and spool 10 can be integrally rotated by a set drag force. That is, it is possible to set the spinning reel at the drag state in which the spool 10 can be given a resistance force (brake force) by the rear drag mechanism.

When the operation lever 5 is returned to the initial position, the control cam 54 is rotated counterclockwise by the operating member 50 and the straddled spring 58, and the engaging claw 56 coming into contact with the third contacting section 54c of the control cam 54 is returned to the initial position while resisting an urging force of the spring 57 as shown in FIG. 1. Due to the foregoing, the engaging groove 33a of the anti-reverse plate 33B and the engaging claw 56 are disengaged from each other, so that the brake rotor 31 can be rotated. When the control cam 54 is rotated counterclockwise, the engaging member 72 is rotated clockwise by an urging force of the spring 71, and the engaging section 72a is engaged with the engaging groove 62a. That is, the spinning reel is set at the non-drag state.

As explained above, in the spinning reel 1 of this embodiment, the operation lever 5 for changing over the drag operation state is attached to the leg section 1b of the reel body 1a attached to the fishing rod. Further, this operation lever 5 is arranged at a position so that the operation lever 5 can be operated with a finger of a hand holding the fishing rod. Therefore, the angler can hold the fishing rod with one hand and change over the drag with a finger of the hand holding the fishing rod. Therefore, the angler can hold the fishing rod and handle a fish by one action, that is, the angler can quickly and simply change over a state of operation of the drag mechanism.

The spinning reel 1 of this embodiment is set at the drag state at all times while the reverse rotation of the rotor 8 is being prevented. In other words, in the case of non-drag state, the spinning reel is set at a state in which the rotor 8 can be reversed at all times. Accordingly, a force given to the fishline can be released at all times by the rotation of at least one of the rotor 8 and the spool 10. Accordingly, it is possible to prevent the fishline from cutting off and also it is possible to prevent a fish body from being damaged when the fishline is suddenly pulled by the fish.

In general, in the case where the fishline is suddenly pulled by a fish while the operation lever 5 is being pushed down in direction A and the reverse rotation of the rotor 8 is being prevented, it is important that the fishline is quickly and smoothly drawn out so as to prevent the fishline, which is directly connected with the hook, from cutting off. Especially when the fishline directly connected with a hook is thin, the fishline must be drawn out immediately. However, actually, there is a time lag from the bite of a fish to the complete change-over of the rotor 8 to the reverse rotation, that is, there is a time lag from the bite of a fish to the returning motion of the operation lever S conducted by the angler to the initial position corresponding to a sudden pulling action of a fish shown in FIG. 1. In this time lag, the tackle can not withstand a force given by the fish. Accordingly, there is a possibility that the fishline directly connected with the hook is cut off or the fish body is damaged. Even if the time lag is short and the rotor 8 can be immediately changed over to a state of reverse rotation, when the rotor 8 is suddenly reversed under the condition that tension is given to the fishline, there is a possibility that the fish unhooks and also there is a possibility that backlash is caused in the fishline.

However, according to the spinning reel 1 of this embodiment, in the period of time from the time of completion of change-over of the operation lever 5 to the time at which the rotor 8 can be reversed, the tension given to the fishline can be released by utilizing the drag mechanism. Therefore, the occurrence of the above problems can be avoided. That is, operation is conducted as follows. In the state in which the rotor is prevented from reversing, the spinning reel is set at the drag state at all times. Therefore, in the case where the fishline is suddenly pulled by a fish in the state in which the rotor is prevented from reversing, a force given to the fishline is released by the rotation of the spool 10 while the operation lever 5 is changed over and the rotor 8 can be reversed, that is, the fishline is drawn out from the spool 10. Therefore, the angler can cope with the situation to handle a fish. That is, when a fish is caught in the state in which the reverse rotation is prevented, the occurrence of problems caused by the time lag is prevented by utilizing the drag, and while the fishline is being drawn out when the drag is exerted, the state in which the reverse rotation of the rotor 8 is prevented is released by the operation lever 5. Due to the above operation, it is possible to smoothly transfer from the state in which the fishline is drawn out by the spool 10 to the state of braking in which the reversing rotor 8 is given a brake force. Therefore, the body of a caught fish is not damaged and the caught fish can be taken in without causing any trouble. When drag mechanism is used, it is possible to avoid the occurrence of a case in which the rotor 8 is suddenly reversed while the fishline is being given tension. Therefore, the occurrence of backlash of the fishline can be prevented.

In this embodiment, there is provided a front drag 60 different from the rear drag. Therefore, when a state of fastening the front drag 60 is adjusted so that the spool 10 can be rotated with respect to the spool shaft 9 by a predetermined force, the operation lever 5 and the change-over mechanism can be used as a mechanism for changing over an intensity of the drag force rather than a mechanism for changing over between a state of operation and a state of non-operation of the drag.

That is, when the drag force on the front drag 60 side is strongly set, that is, when the drag is tightly fastened and at the same time the drag force on the rear drag side is weakly set, that is, when the drag adjusting knob 64 is lightly fastened, if the operation lever 5 is kept at the initial position, the spool shaft 9 is prevented from rotating, however, the spool 10 can be rotated with respect to the spool shaft 9 by a predetermined force. This state is the non-operation state of rear drag, and at the same time this state is the operation state of front drag (the strong drag state or the spinning reel having a usual front drag). Therefore, the spool 10 can be rotated when a force exceeding a strong drag force, which has been set on the front drag 60 side, is given.

On the other hand, when the operation lever 5 is pushed down in direction A, the reverse rotation of the rotor 8 is prevented, and the rotation of the spool shaft 9 is allowed. Therefore, it is possible for the spool 10 to be rotated by a weak drag force which has been set on the rear drag side, that is, when a force exceeding a weak drag force which has been set on the rear drag side is given, the spool 10 can be immediately rotated. This state is the operation state of rear drag, that is, this state is a weak drag state.

Second Embodiment

Figure 5:
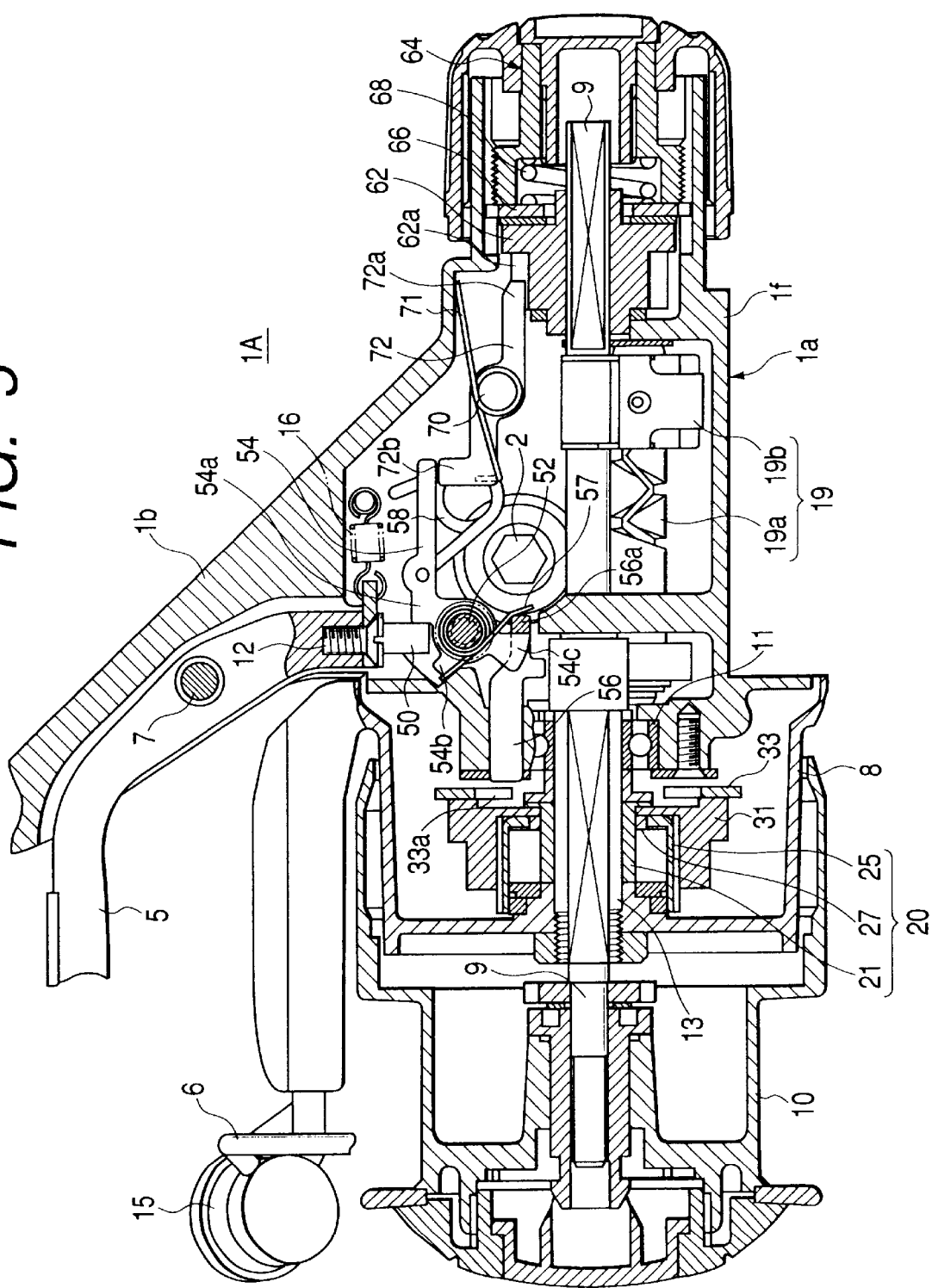
FIG. 5 is a cross-sectional view showing a spinning reel of the second embodiment of the present invention.

FIG. 5 is a view showing the second embodiment of the present invention. In this connection, like reference characters are used to indicate like parts in the first embodiment, and the explanations are omitted here.

As shown in the drawing, in the spinning reel 1A of this embodiment, the spool 10 is directly fixed to the spool shaft 9 without using the front drag. That is, the spool 10 can be rotated integrally with the spool shaft 9. Other points of the structure are the same as those of the first embodiment.

Even when the above structure is adopted, the same effect as that of the first embodiment can be provided. However, since no front drag 60 is provided in the above structure, the change-over mechanism can not change over an intensity of the drag force, that is, the change-over mechanism can only change over between a state of operation and a state of non-operation of the drag mechanism.

Third Embodiment

Figure 6:
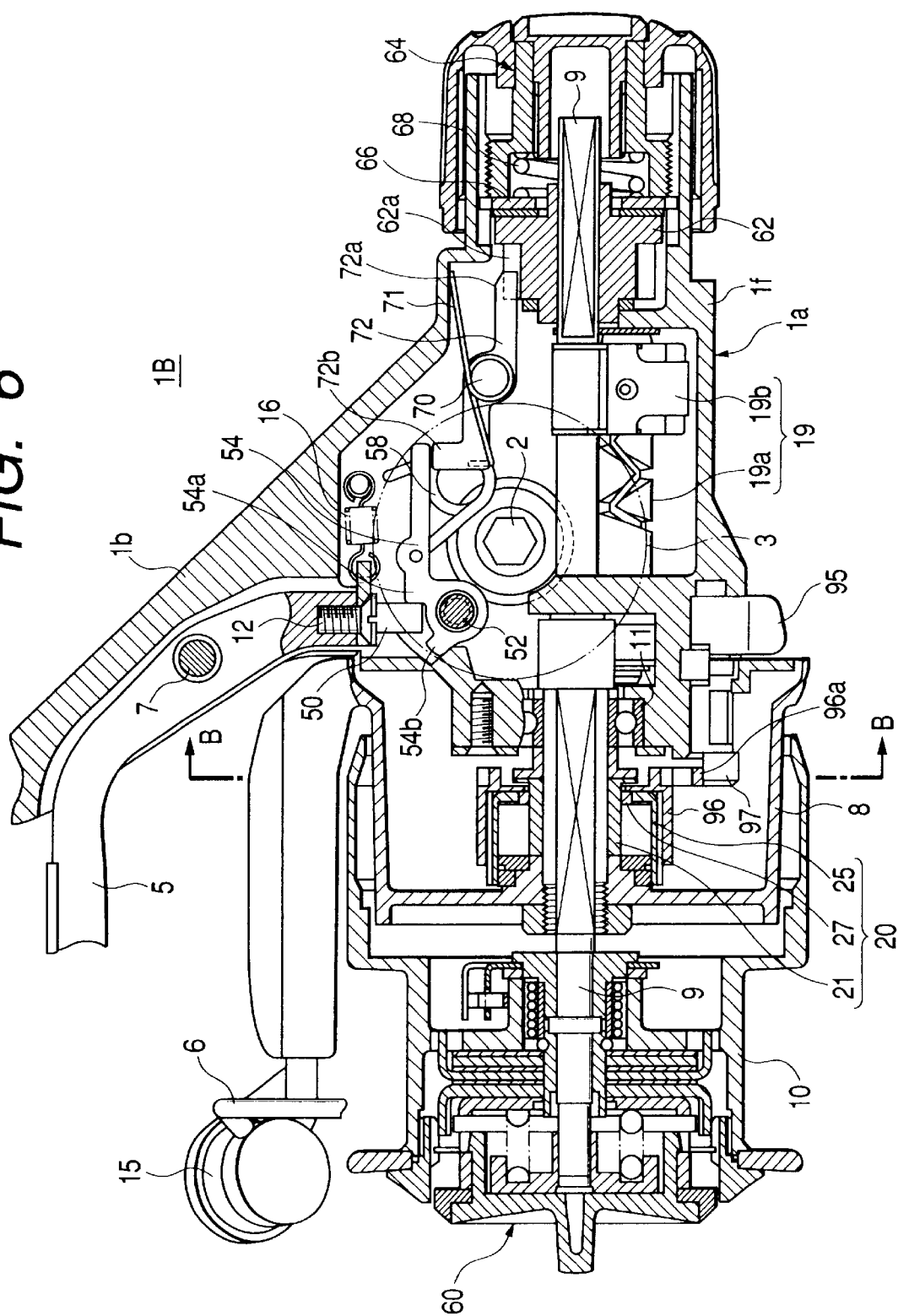
FIG. 6 is a cross-sectional view showing a spinning reel of the third embodiment of the present invention.
Figure 9:
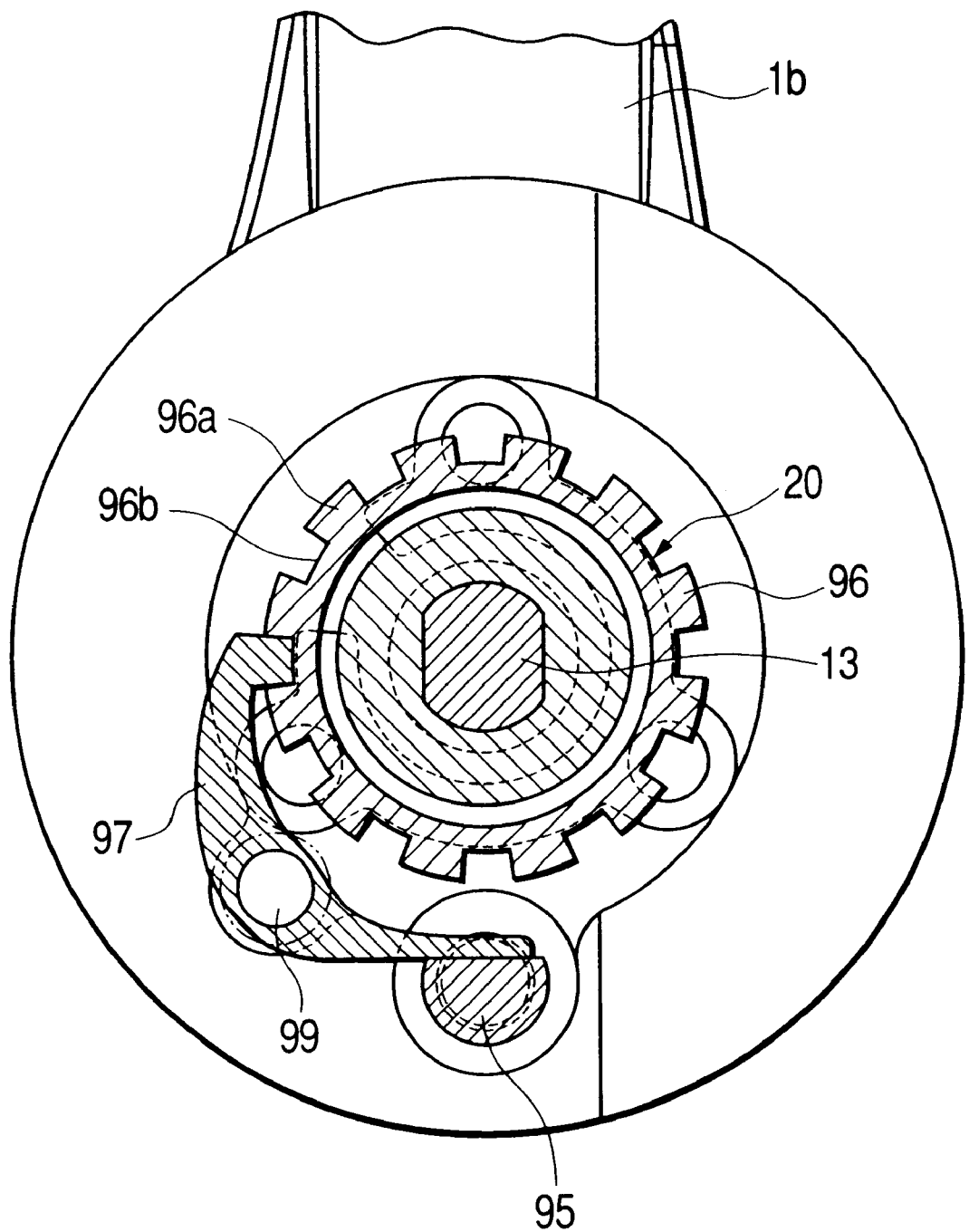
FIG. 9 is a cross-sectional view taken on line B—B in FIG. 6.

FIGS. 6 and 9 are views showing the third embodiment of the present invention. In this connection, like reference characters are used to indicate like parts in the first and the third embodiment, and the explanations are omitted here.

As shown in the drawing, in the spinning reel 1B of this embodiment, the structure of the anti-reverse mechanism is different from that of the first embodiment and operated only by the change-over member 95 provided differently from the operation lever 5. That is, the operation lever 5 functions only as an operation lever for changing over a state of operation of the drag, that is, the operation lever 5 changes over an intensity of the drag force or the operation lever 5 changes over between a state of operation and a state of non-operation of the drag mechanism.

As shown in FIG. 9 in detail, the anti-reverse mechanism includes: a ratchet wheel 96 engaged with the outer ring 25 of the one-way clutch 20 and rotated integrally with it; and a stopper claw 97 colliding with the inner end portion of the change-over member and capable of rotating round the support shaft 99. On the outer circumference of the ratchet wheel 96 between the claws 96a, there are provided a plurality of engaging recesses 96b capable of engaging with the stopper claw 97.

In the above structure, when the change-over member 95 is rotated in one direction and the stopper claw 97 is engaged with the engaging recess 96b of the ratchet wheel 96, the rotor 8 can be prevented from reversing. When the change-over member 95 is rotated in another direction and the stopper claw 97 is released from the engaging recess 96b of the ratchet wheel 96, the rotor 9 can be reversed. Other points of the structure are the same as those of the first embodiment.

As described above, in this embodiment, the operation lever 5 for changing over a state of operation of the drag is arranged in the leg section 1b of the reel body 1a attached to the fishing rod. Further, this operation lever 5 is arranged at a position so that the operation lever 5 can be operated with a finger of a hand holding the fishing rod. Accordingly, a state of operation of the drag mechanism can be quickly and simply changed over.

Forth Embodiment

Figure 7:
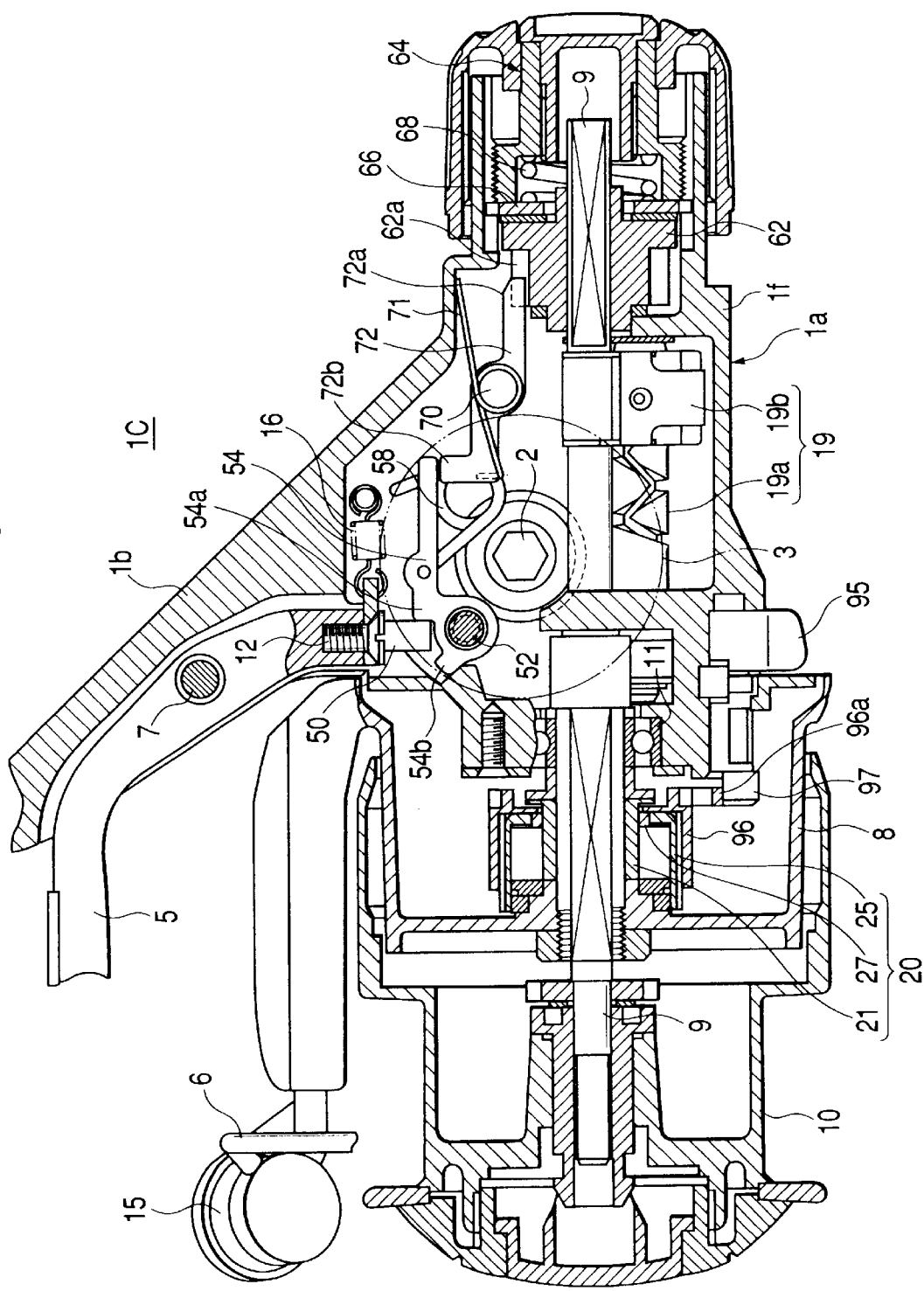
FIG. 7 is a cross-sectional view showing a spinning reel of the forth embodiment of the present invention.

FIG. 7 is a view showing a variation of the third embodiment. In the spinning reel 1C of this variation, the spool 10 is directly fixed to the spool shaft 9 without using the front drag, that is, the spool 10 can be rotated integrally with the spool shaft 9. Other points of the structure are the same as those of the third embodiment.

Even when the above structure is adopted, the same effect as that of the third embodiment can be provided. However, since no front drag 60 is provided in the above structure, the change-over mechanism can not change over an intensity of the drag force, that is, the change-over mechanism can only change over between a state of operation and a state of non-operation of the drag mechanism.

Fifth Embodiment

Figure 11:
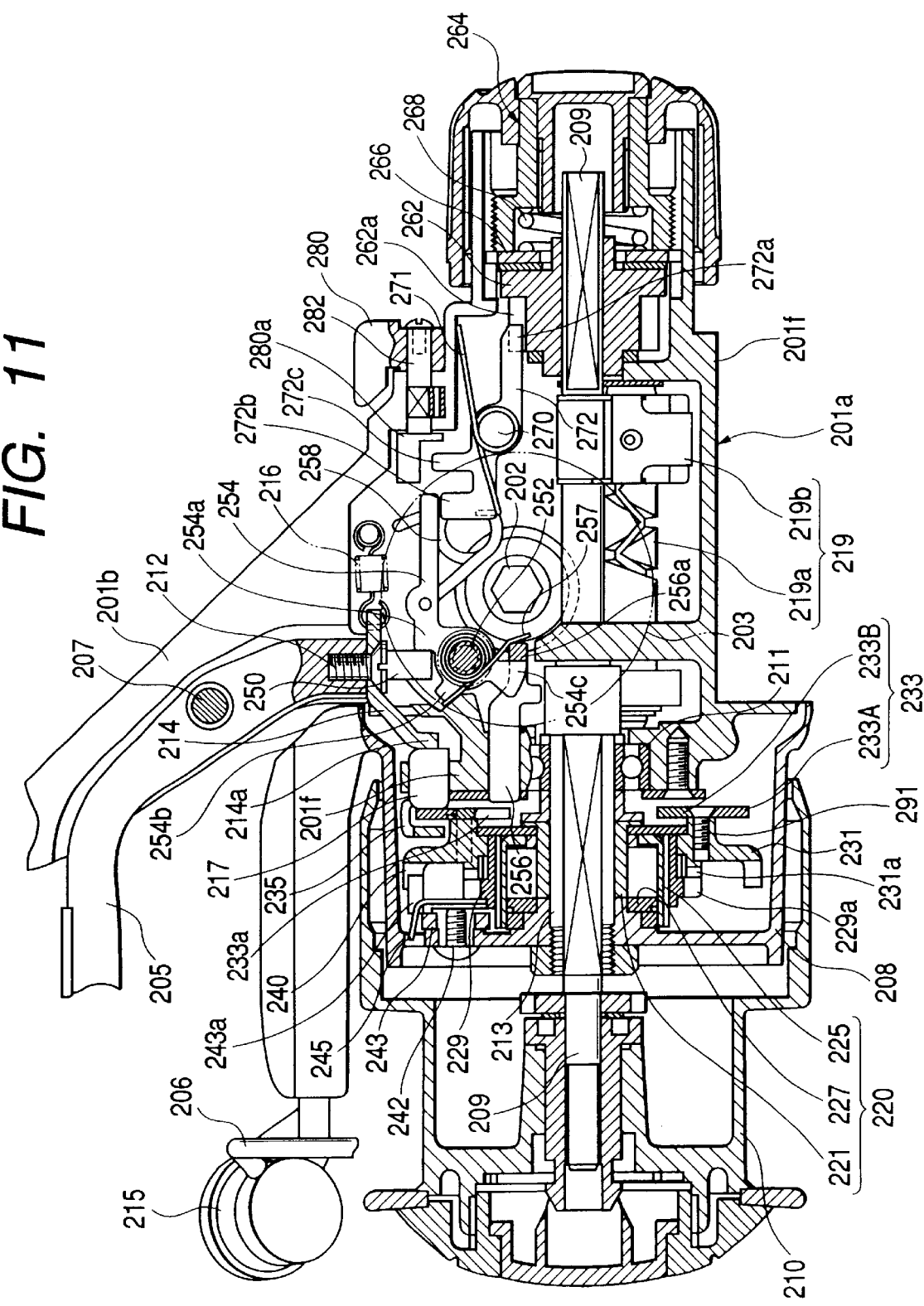
FIG. 11 is an enlarged cross-sectional view showing the spinning reel of FIG. 10.
Figure 14:
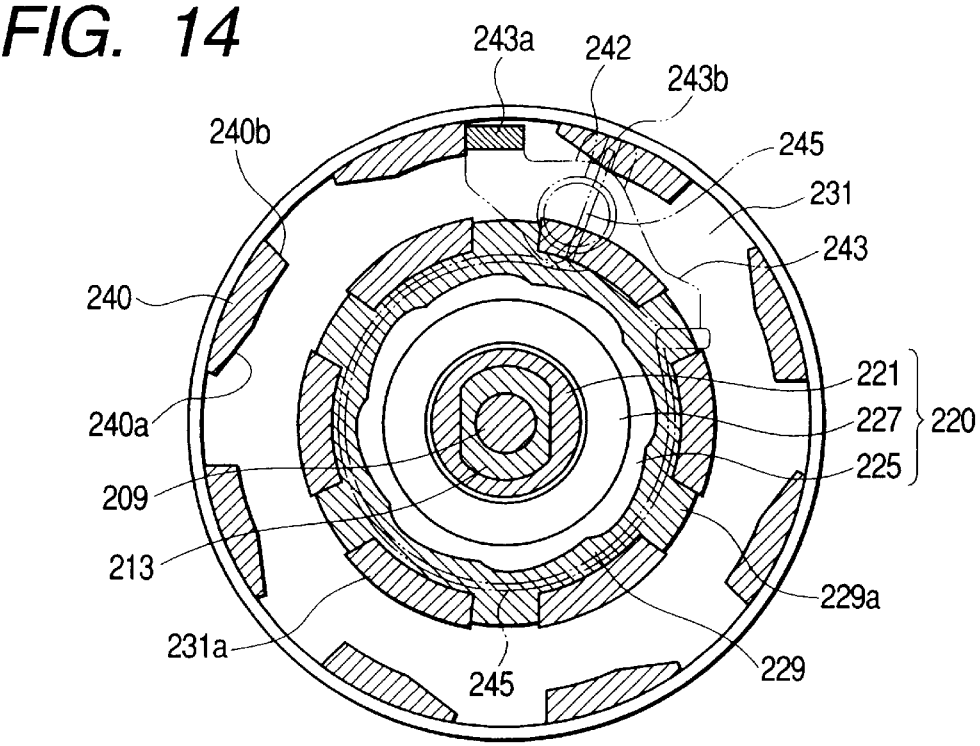
FIG. 14 is a cross-sectional view taken. on line A—A in FIG. 10 in the case of reverse rotation of a rotor.
Figure 15:
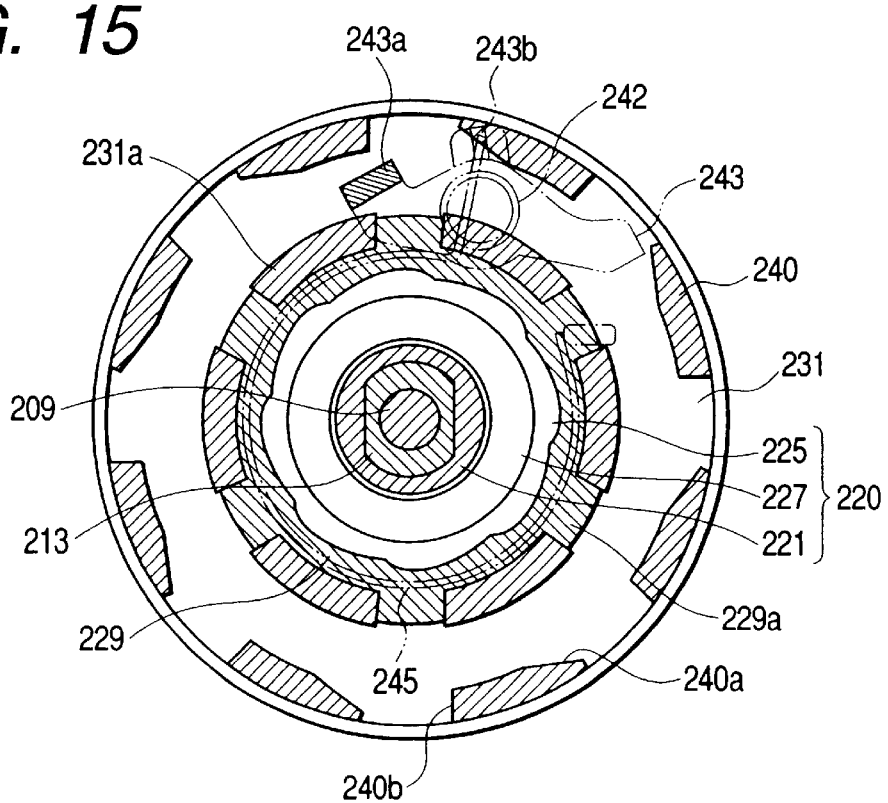
FIG. 15 is a cross-sectional view taken on line A—A in FIG. 10 in the case of normal rotation of a rotor.
Figure 16:
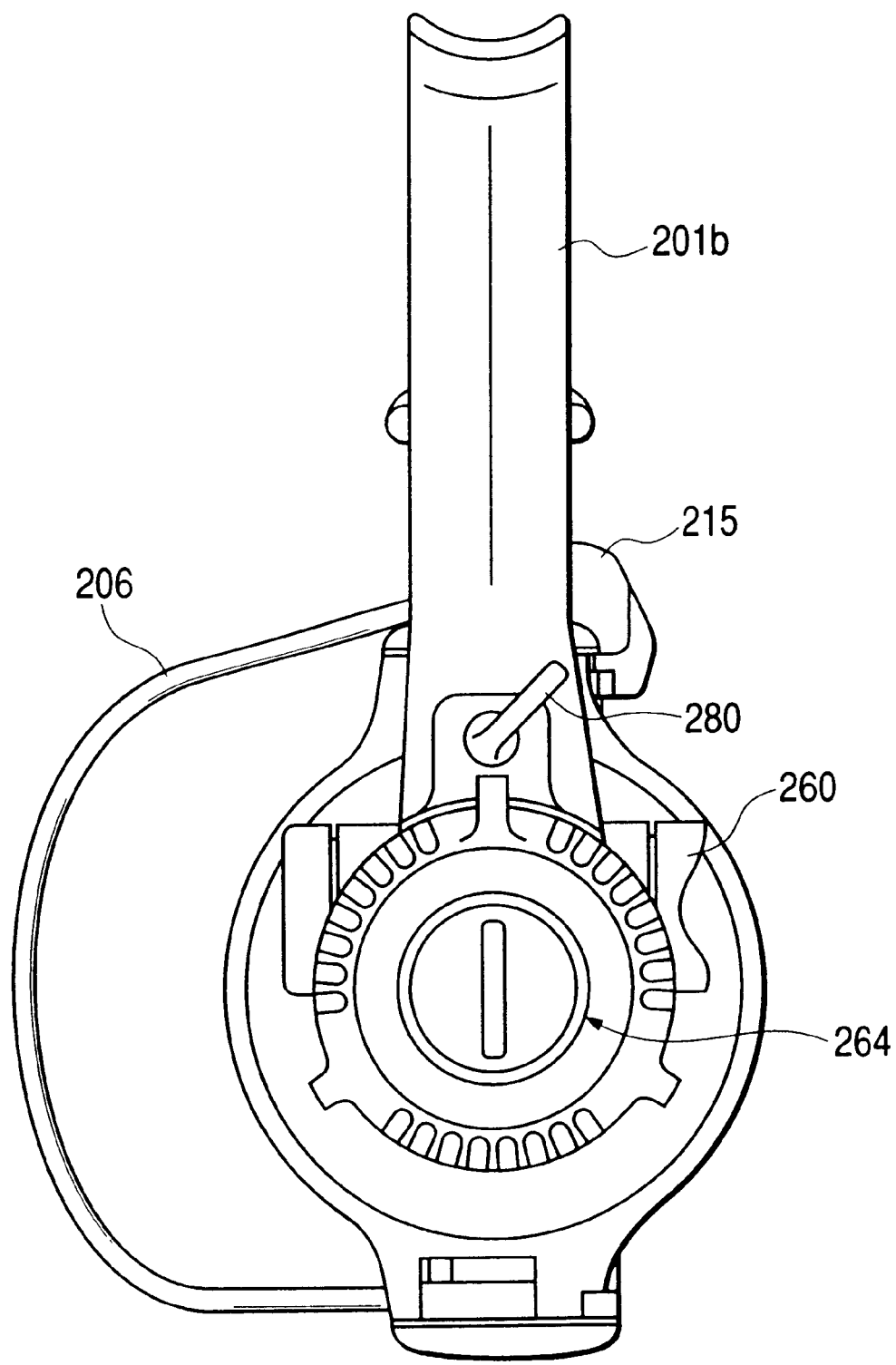
FIG. 16 is a rear view of a reel body in the case where a change-over lever is changed over to the first position.

FIGS. 10 to 20 are views showing the first embodiment of the present invention. As shown in FIGS. 10, 11, 16 and 10, the spinning reel 201 for fishing of this embodiment includes: a reel body 201a; a leg portion 201b extending from the reel body 201a; and a fishing rod attaching portion 201c formed at an end portion of the leg portion 201b, attached to a fishing rod not shown in the drawing. In the reel body 201a, a handle shaft 202. is pivotally provided. The handle 260 (shown in FIGS. 16 and 19) is fixed to an end section of the handle shaft 202 protruding from the reel body 201a.

The drive gear 203 is attached to the handle shaft 202. This drive gear 203 is engaged with the pinion gear 213 which is arranged in a direction perpendicular to the handle shaft 202 and pivotally supported via the bearing 211. The rotor 208 having the bail 206 and the fishline guide device 215 is integrally attached to an end section of the pinion gear 213.

The spool shaft 209, which can be slid in a direction perpendicular to the handle shaft 202 and pivotally supported, is inserted into the pinion gear 213. The spool 210 round which the fishline is wound is fixed to an end section of the spool shaft 209, wherein the spool 210 can not be rotated with respect to the spool shaft 209, that is, the spool 210 can be rotated integrally with the spool shaft 209. The oscillating mechanism 219 is engaged with the drive gear 203. This oscillating mechanism 219 includes: a worm shaft 219a engaged and rotated with the drive gear 203; and a slider 219b engaged with a groove of the worm shaft 219a, wherein the slider 219b can not be moved with respect to the spool shaft 209 in the axial direction. When the handle shaft 202 is rotated by the rotation of the handle 260, the spool shaft 209 is reciprocated in the axial direction.

In the above structure, when the handle 260 is rotated so as to rotate the handle shaft 202, the spool 210 attached to the spool shaft 209 with the oscillating mechanism 219 is reciprocated back and forth, and the rotor 208 is rotated via the drive gear 203 and the pinion gear 213. Accordingly, the fishline is uniformly wound round the spool 210 via the fishline guide device 215.

The reel body 201a includes: a brake mechanism for giving a brake force to the reverse rotation of the rotor 208; and a anti-reverse mechanism for preventing the reverse rotation of the rotor 208. These mechanisms are operated by the operation lever 205 which is an operation member pivotally attached to the leg section 201b by the support shaft 207. The operating portion 205a, at which an angler's finger is hooked, is formed at one end section of the operation lever 205. The pushing plate 214 is attached to the other end section of the operation lever 205 located at a position in the reel body 201a via the screw 212. A pushing portion 214a for pushing the brake shoe 217 of the brake mechanism described later is formed at an end section of the pushing plate 214.

When the operation lever 205 is pushed up in direction B from the initial position shown in FIG. 10, the brake shoe 217 is pushed by the pushing section 214a so that the brake mechanism is activated. When the operation lever 205 is pushed down in direction A from the initial position, the anti-reverse mechanism is activated. Between the pushing plate 214 and the reel body 201a, there is provided a tension spring 216 for holding the operation lever 205 at the initial position at all times. Accordingly, when the operation force given to the operation lever 205 is released after the operation lever 205 has been pushed up in direction B (clockwise) round the support shaft 207, the operation lever 205 is returned to the initial position by a pushing force of the spring 216.

As shown by the enlarged views of FIGS. 14 and 15, the brake mechanism for giving a brake force to the reverse rotation of the rotor 208 includes: a brake rotor (rotary body) 231 attached to the pinion gear 213 via the one-way clutch 220; and a ring-shaped brake member 233 attached and fixed to a surface of the brake rotor 231.

Figure 12:
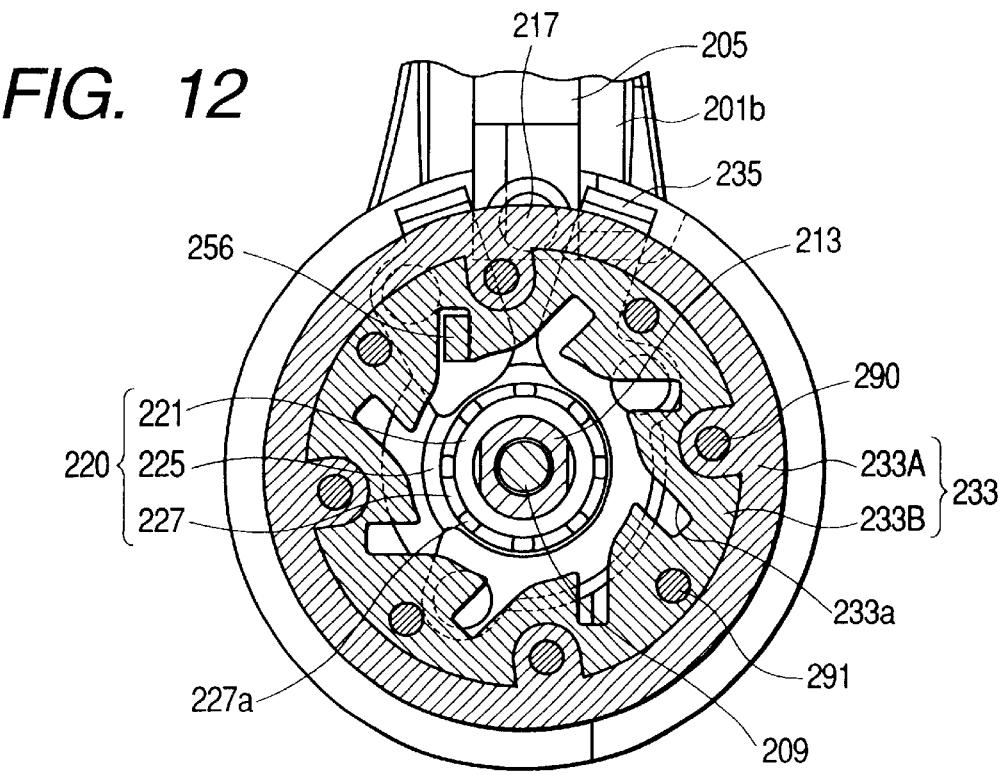
FIG. 12 is a cross-sectional view taken on line B—B in FIG. 10.

As shown in FIGS. 11 and 12 in detail, the brake member 233 includes: a brake plate (brake section) 233A located outside; and a anti-reverse plate (anti-reverse section) 233B located inside. The brake plate 233A is fixed onto a surface of the brake rotor 231 via the screw 290, and the. anti-reverse plate 233B is fixed onto a surface of the brake rotor 231 via the screw 291. In this case, the surface of the brake plate 233A and the surface of the anti-reverse plate 233B are substantially on the same plane. Material of the brake plate 233A and material of the anti-reverse plate 233B are different from each other. The brake plate 233A is made of material, the thermal stability of which is high, the life of which is long and further the squeaky noise of which is low when it is incorporated into the brake mechanism, that is, the brake plate 233A is made of bronze or phosphor bronze. The anti-reverse plate 233B is made of material, the impact resistance of which is excellent and the hardness of which is high. That is, the anti-reverse plate 233B is made of stainless steel or carbon steel.

The pressure-contact piece 235, which is arranged crossing the brake plate 233A, is supported by the frame 201f of the reel body 201a. For example, the wooden brake shoe 217, which slides on and comes into pressure contact with the brake plate 233A, is movably held by the frame 201f.

Figure 13:
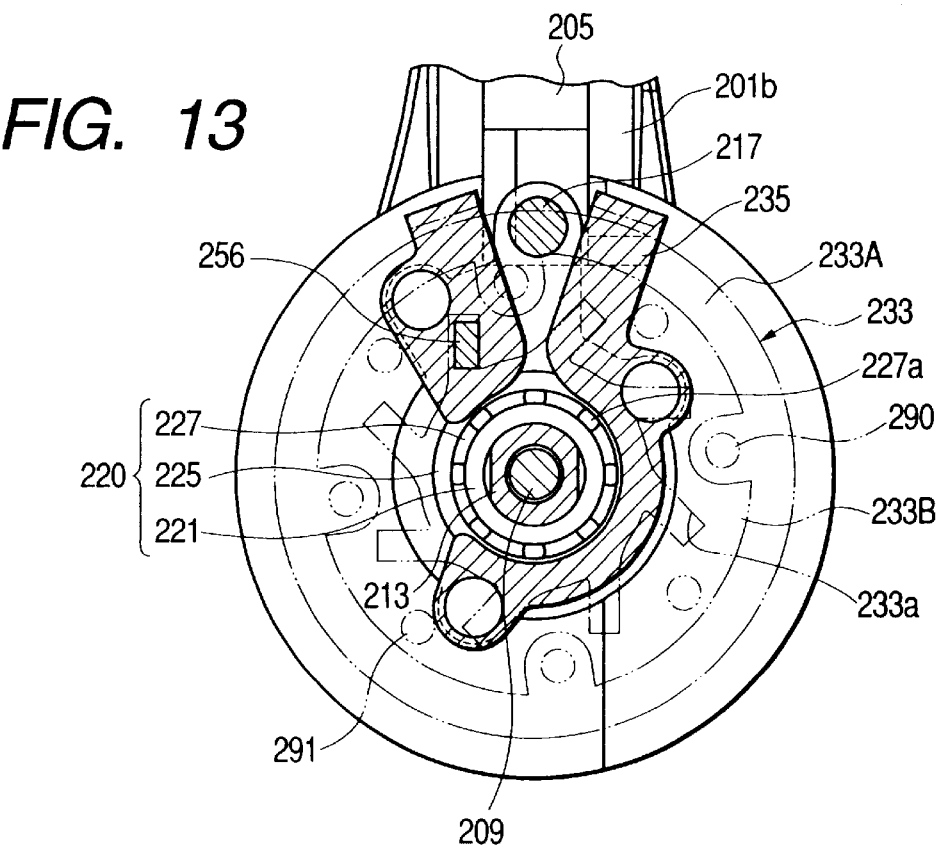
FIG. 13 is a cross-sectional view taken on line C—C in FIG. 10.

The one-way clutch 220 includes: an inner ring 221 engaged with the pinion gear 213 so that the inner ring 221 can not be rotated with respect to the pinion gear 213; a retainer 227 arranged outside the inner ring 221; and outer ring 225 arranged outside the retainer 227. The retainer 227 retains a plurality of rolling members 227a as shown in FIGS. 12 and 13. Each rolling member 227a is pushed in one direction by a spring member provided in the retainer 227. On the inner circumferential face of the outer ring 225, there are provided a free rotating region in which each rolling member 227a can be freely rotated and a wedge region in which each rolling member 227a can not be rotated. The one-way clutch 220 composed as described above is operated as follows. When the inner ring 221 is normally rotated together with the pinion gear 213, that is, when the rotor 208 is rotated in the direction of winding the fishline, the rolling members 227a of the retainer 227 are located in the free rotating region of the outer ring 225, so that the torque of the inner ring 221 can not be transmitted to the outer ring 225. However, when the inner ring 221 is reversed together with the pinion gear 213, that is, when the rotor 208 is rotated in the direction of drawing out the fishline, the rolling members 227a of the retainer 227 are located in the wedge region of the outer ring 225, so that the torque of the inner ring 221 can be transmitted to the outer ring 225.

The retaining member 229 is press-fitted onto the outer circumference of the outer ring 225. The brake rotor 231 is engaged with the outer circumference of the retaining member 229 in such a manner that the brake rotor 231 can not be rotated with respect to the retaining member 229. Specifically, a plurality of protrusions 229a, protruding in the radial direction, which are arranged at predetermined intervals in the circumferential direction of the retaining member 229, are formed in the outer circumferential face of the retaining member 229. Each of a plurality of extending sections 231a, which respectively extend from the brake rotor 231 in the axial direction of the spool shaft 209, is engaged between the protrusions 229a, 229a. That is, the brake rotor 231 is engaged with the retaining member 229 being incapable of rotating when the protrusions 229a and the extending sections 231a are engaged with each other, and the brake rotor 231 can be moved only in the axial direction with respect to the retaining member 229.

When an urging force given to the brake rotor 231 by the operation lever 205 via the brake shoe 217 is released, the brake rotor 231 is moved in the axial direction by a pushing force of a spring not shown along the retaining member 229. Therefore, the brake rotor 231 is returned to the initial position shown in FIG. 10.

According to the above connecting structure in which the pinion gear 213 and the brake rotor 231 are connected with each other via the one-way clutch 220, only when the pinion gear 213 is reversed, the brake rotor 231 and the retaining member 229 are directly connected with the pinion gear 213 (rotor 208) via the one-way clutch 220 and rotated integrally with the rotor 208.

In the peripheral edge section of the brake rotor 231, there are provided a plurality of engaging protrusions 240, for example, eight pieces of engaging protrusions 240 are arranged at predetermined intervals in the circumferential direction. In each engaging protrusion 240, there are provided a tapered face 240a for guiding the engaging claw 243a into a clearance between the engaging protrusions 240 when the rotor 208 is reversed and a stopper face 240b coming into contact with the engaging claw 243a located in the clearance between the engaging protrusions 240.

In the rotor 208, the rotational member 243 is pivotally supported by the pin 242 toward the brake rotor 231. At one end of the rotational member 243, there is provided an engaging claw 243a capable of engaging with the clearance between the engaging protrusions 240. In the rotor 208, there are provided two bosses for restricting the rotation of the rotational member 243 in various directions, and these two bosses are formed toward the brake rotor 231. In the rotational member 243, there is provided a U-shaped groove 243b. Into this groove 243b, an end section of the leaf spring 245, which is wound round the retaining member 229, is fixed.

As shown in the enlarged view of FIG. 11, the anti-reverse mechanism for preventing the reverse rotation of the rotor 208 includes: an operating member 250 protruding from the other end section of the operation lever 205 or the pushing plate 214; a control cam 254 pivotally supported by the support shaft 252 and rotated by the operating member 250; an engaging claw 256 movably held by the frame 201f of the reel body 201a and moved by the rotation of the control cam 254 toward the anti-reverse plate 233B of the brake member 233; and a plurality of engaging grooves 233a formed on the inner circumferential face of the anti-reverse plate 233B and engaged with the engaging claw 256. The control cam 254 includes: a first 254a and a second contacting section 254b coming into contact with the operating member 250; and a third contacting section 254c coming into contact with the engaging claw 256. The operating member 250 is located between the first 254a and the second contacting section 254b. The third contacting section 254c comes into contact with the protrusion 256a protruding from the end section of the engaging claw 256 to the side. The control cam 254 is urged in the rotational direction at all times by the straddled spring 258 arranged between the control cam 254 and the reel body 201a. The engaging claw 256 is urged in the direction so that the engaging claw 256 can be engaged with the engaging groove 233a of the anti-reverse plate 233B by the spring 257 wound around the support shaft 252.

In the above structure, in the case where the operation lever 205 is located at the initial position shown in FIG. 10, the first contacting section 254a of the control cam 254 comes into contact with the operation body 250 by an urging force of the straddled spring 258. In this case, the pushing force of the straddled spring 258 acts in a direction so that the control cam 254 can be rotated counterclockwise in the drawing. At the same time, the third contacting section 254c coming into contact with the protrusion 256a of the engaging claw 256 resists an urging force of the spring 257, and the engaging claw 256 is separated from the anti-reverse plate 233B. When the operation lever 205 is pushed down from the initial position in direction A, the operating member 250 resists a pushing force of the straddled spring 258, and the control cam 254 is rotated clockwise in the drawing. At this time, the straddled spring 258 is oscillated in accordance with the rotation of the control cam 254. When the straddled spring 258 exceeds its dead point, the straddled spring 258 gives a urging force to the control cam 254 in a direction so that the control cam 254 can be rotated clockwise. Accordingly, after that, the control cam 254 is rotated clockwise by not the operating member 250 but the urging force of the straddled spring 258. Due to the foregoing, the first contacting section 254a is separated from the operating member 250, while the engaging claw 256 coming into contact with the third contacting section 254c is moved toward the anti-reverse plate 233B. Then, the engaging claw 256 is engaged with the engaging groove 233a of the anti-reverse plate 233B as shown in FIG. 12. When the second contacting section 254b comes into contact with the operating member 250, the control cam 254 stops rotating. That is, the engagement of the engaging groove 233a with the engaging claw 256 is kept, and the operation lever 205 is kept at the rotor anti-reverse position that the operating lever 205 is pushed in direction A.

In the spinning reel 201 of this embodiment, there is provided a rear drag mechanism of the rear drag type in which the spool 210 is allowed to rotate in the fishline drawing direction, that is, the torque of the spool is controlled, while the spool 210 is being given a brake force. As shown in FIGS. 10 and 11, this drag mechanism includes: a substantially cylindrical press contact member 262 attached to the spool shaft 209 and contacted with the frame 201f of the reel body 201a with pressure; a drag adjusting knob 264 arranged at the rear of the reel body 201a and screwed to the frame 201f of the reel body 201a; a plurality of frictional plates 66 arranged between the press contact member 62 and the drag adjusting knob 264; and a compression spring 68 interposed between the frictional plate 66 and the drag adjusting knob 264. In this case, the press contact member 62 is attached to the spool shaft 209 in such a manner that the press contact member 262 can not be rotated with respect to the spool shaft 209, that is, the press contact member 62 is rotated integrally with the spool shaft 209. The press contact member 62 can be moved in the axial direction with respect to the spool shaft 209. On the outer circumferential face of the press contact member 262, there are provided a plurality of engaging grooves 262a engaged with the engaging member 272 of the change-over mechanism described later.

In the above drag mechanism, the drag adjusting screw 264 is fastened while resisting an urging force of the spring 68, that is, the drag adjusting screw 264 is screwed into the frame 201f. Then, the press contact member 62 comes into pressure contact with the frame 201f of the reel body 201a via the frictional plate 66 by the urging force corresponding to the fastening force, so that the rotation of the spool shaft 209 can be restricted. Accordingly, the rotation of the spool shaft 210 rotating integrally with the spool shaft 209 can be restricted. When the drag adjusting knob 264 is loosened, the rotation of the spool shaft 209 can be allowed, that is, the rotation of the spool 210 can be allowed according to the looseness of the drag adjusting knob 264. In the spinning reel 201 of this embodiment, there is provided a change-over mechanism for changing over a state of operation of the above rear drag mechanism. This change-over mechanism is operated by the operation lever 205 or the change-over lever 280 which is a change-over mechanism operating member. This change-over mechanism changes over between a drag state in which the rear drag mechanism can give a resistance force (brake force) to the rotation of the spool 210 and a non-drag state in which the rotation of the spool 10 is prevented so that the drag function can not be exerted.

Specifically, the change-over lever 280 is pivotally attached to the rear portion of the reel body 201a via the support shaft 82, and the pushing section 280a is arranged at the end of the change-over lever 280 located in the reel body 201a. The change-over mechanism is provided with an engaging member 272 pivotally attached to a support shaft 270. This engaging member 272 has an engaging section 272a engaged with the engaging groove 262a of the press contact member 262 composing the rear drag mechanism. The engaging member 272 is urged at all times by the spring 271 wound round the support shaft 270 in a rotational direction so that the engaging section 272a can be engaged with the engaging groove 262a. On the opposite side to the engaging section 272a with respect to the support shaft 270, the engaging member 272 includes: a first contacting section 272b capable of contacting with the control cam 254 composing the anti-reverse mechanism; and a second contacting section 272c capable of contacting with the pushing section 280a of the change-over lever 280.

Next, operation of the above spinning reel 201 will be explained as follows.

First, explanations will be made into a case in which the change-over lever 280 is held at the first position shown in FIG. 16.

When the change-over lever 280 is held at the first position, the pushing section 280a of the change-over lever 280 is held being separate from the second contacting section 272c of the engaging member 272 composing the change-over mechanism as shown in FIGS. 10, 11, 17 and 19.

Figure 17:
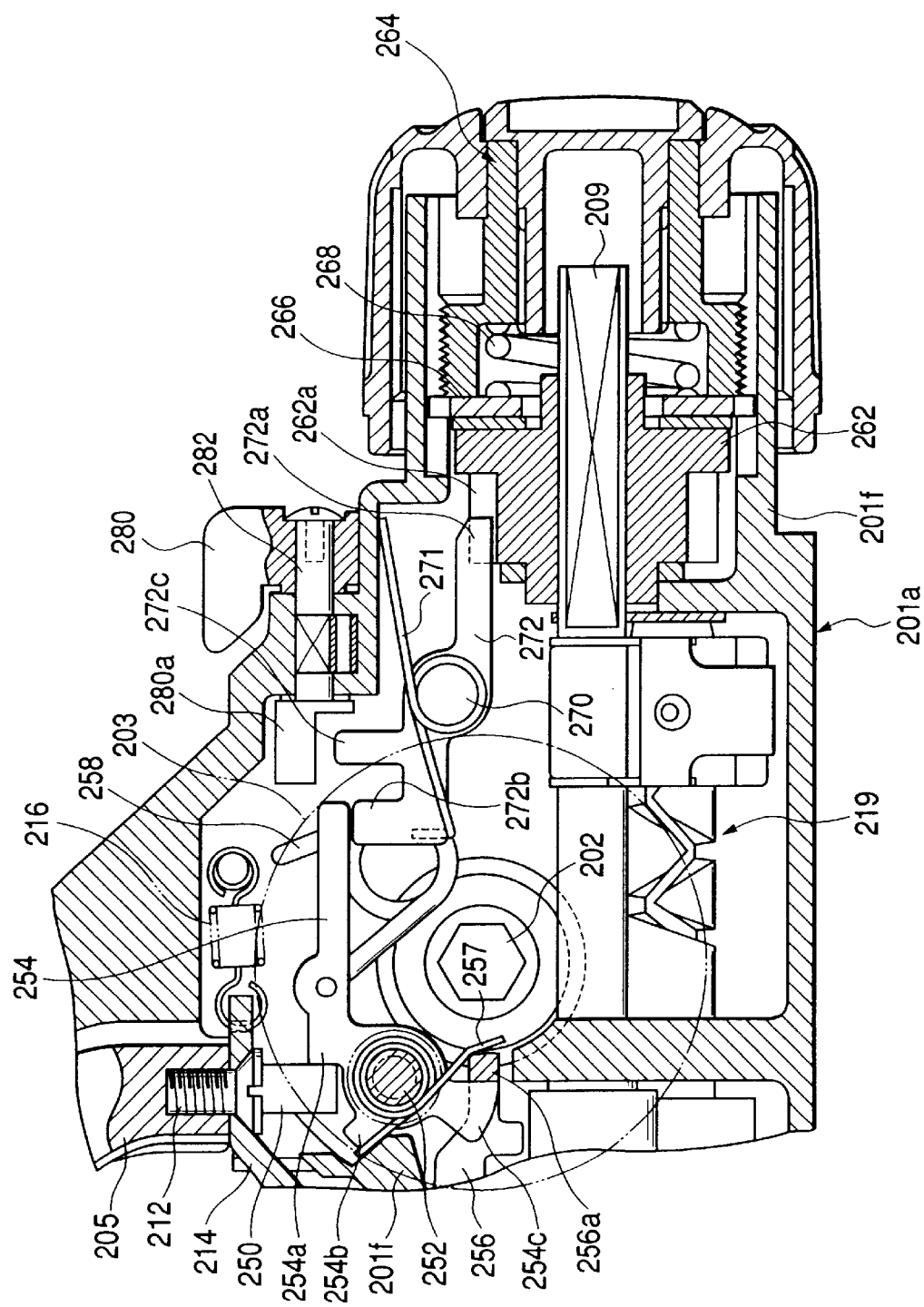
FIG. 17 is a cross-sectional view showing a primary portion of a state in which a change-over lever is held at the first position and an operation lever is held at the initial position.

When the change-over lever 280 is kept at the first position and the operation lever 205 is kept at the initial position as shown in FIGS. 10, 11 and 17, the control cam 254 is pushed by the straddled spring 258 and its first contacting section 254a comes into contact with the operating member 250 and the control cam 254 does not give a force to the first contacting section 272b of the engaging member 272 for rotating. Therefore, the engaging member 272 can not be rotated by the control cam 254. Accordingly, the engaging section 272a of the engaging member 272 is kept in a state in which the engaging section 272a of the engaging member 272 is engaged with the engaging groove 262a of the pressure contacting member 262 composing the drag mechanism by an urging force of the spring 271. Accordingly, the rotation of the pressure contacting member 262 is prevented, and the rotation of the spool shaft 209 engaged with the pressure contacting section 262 is restricted. That is, the rotation of the spool 210, which is attached to the spool shaft 209 being incapable of rotating, is prevented. In this way, the device is set in the non-drag state in which the drag function is not exerted.

When the pinion gear 213 is normally rotated via the handle 260 in the above state, the rotor 208 attached to the pinion gear 213 is also normally rotated being integrated with the pinion gear 213, that is, the rotor 208 attached to the pinion gear 213 is rotated in the fishline winding direction. At this time, the brake rotor 231 is not rotated by the connecting action of the one-way clutch 220. The rotational member 243, which is supported by the rotor 208 and normally rotated together with the rotor 208, is given a force in the reverse rotational direction by the action of the leaf spring 245, so that the rotational member 243 is rotated round the pin 242, and one end portion of the rotational member 243 collides with the boss of the rotor 208, and the engaging claw 243a is retracted inside so that it can be separated from the engaging protrusion 240 of the brake rotor 231 as shown in FIG. 15. Accordingly, the rotational member 243 is freely rotated in the normal direction together with the rotor 208 while the rotational member 243 is not restricted by the brake rotor 231. Therefore, even when the operation lever 205 is pushed up in direction B in the above condition and the brake plate 233A of the brake member 233 is pinched between the brake shoe 217 and the pressure contacting piece 35, the rotor is not given a brake force at all. In this case, the brake rotor 231 is moved in the axial direction along the retaining member 229 by a pushing force of the brake shoe 217. In this case, that is, in the case where the operation lever 205 is pushed up in direction B, the control cam 254 is not activated. Therefore, engagement of the engaging section 272a with the engaging groove 262a can be kept, that is, the non-drag state can be kept.

When the pinion gear 213 is reversed while the change-over lever 280 is being kept at the first position and the operation lever 205 is being kept at the initial position, the rotor 208 attached to the pinion gear 213 is reversed integrally with the pinion gear 213, that is, the rotor 208 attached to the pinion gear 213 is rotated in the fishline drawing direction at this time, the brake rotor 231 is also reversed together with the rotor 208 by the connecting action of the one-way clutch 220. Accordingly, when the operation lever 205 is pushed up in direction B in the above condition, the brake plate 233A is pinched between the brake shoe 217 and the pressure contacting piece 35. When the brake is applied to the brake rotor 231, a brake force corresponding to an amount of rotation of the operation lever 205 can act on the rotor 208, which rotates integrally with the brake rotor 231, via the one-way clutch without generating any time lag. In this case, a brake force given to the brake rotor 231 and a torque of the rotor 208 act in the opposite direction to each other in the wedge region of the outer ring 225 of the one-way clutch 220. However, if these forces are in an allowable load range of the one-way clutch 220, the rotor 208 and the brake rotor 231 are not rotated to each other. That is, even in the case of braking operation, the rotor 208 and the brake rotor 231 are rotated integrally with each other. Accordingly, the engaging claw 243a of the rotational member 243 rotating integrally with the rotor 208 is not engaged with the brake rotor 231, and all torque of the rotor 208 is received by the one-way clutch 220, for example, a force drawn by a fish is received by the one-way clutch 220. However, when the force acting in the wedge region of the outer ring 225 exceeds the allowable load of the one-way clutch 220, that is, when the torque of the rotor 208 and the braking force acting on the brake rotor 231 exceed the allowable load of the one-way clutch 220, the one-way clutch 220 slips, and the rotor 208 starts rotating with respect to the brake rotor 231. Due to the foregoing, the rotational member 243, which is reversed integrally with the rotor 208, is given a force in the direction of normal rotation by the action of the leaf spring 245. Therefore, the rotational member 243 is rotated round the pin 242, and its one end portion collides with the boss of the rotor 208, and the engaging claw 243a protrudes between the engaging protrusions 240 of the brake rotor 231. As a result, the rotor 208 is engaged with the brake rotor 231, and they are reversed being integrated with each other. Therefore, after that, a brake force acting on the brake rotor 231 directly acts on the rotor 208 without being transmitted via the one-way clutch 220. Accordingly, all torque of the rotor can be received by the brake rotor 231, for example, all force drawn by a fish can be received by the brake rotor 231.

Figure 18:
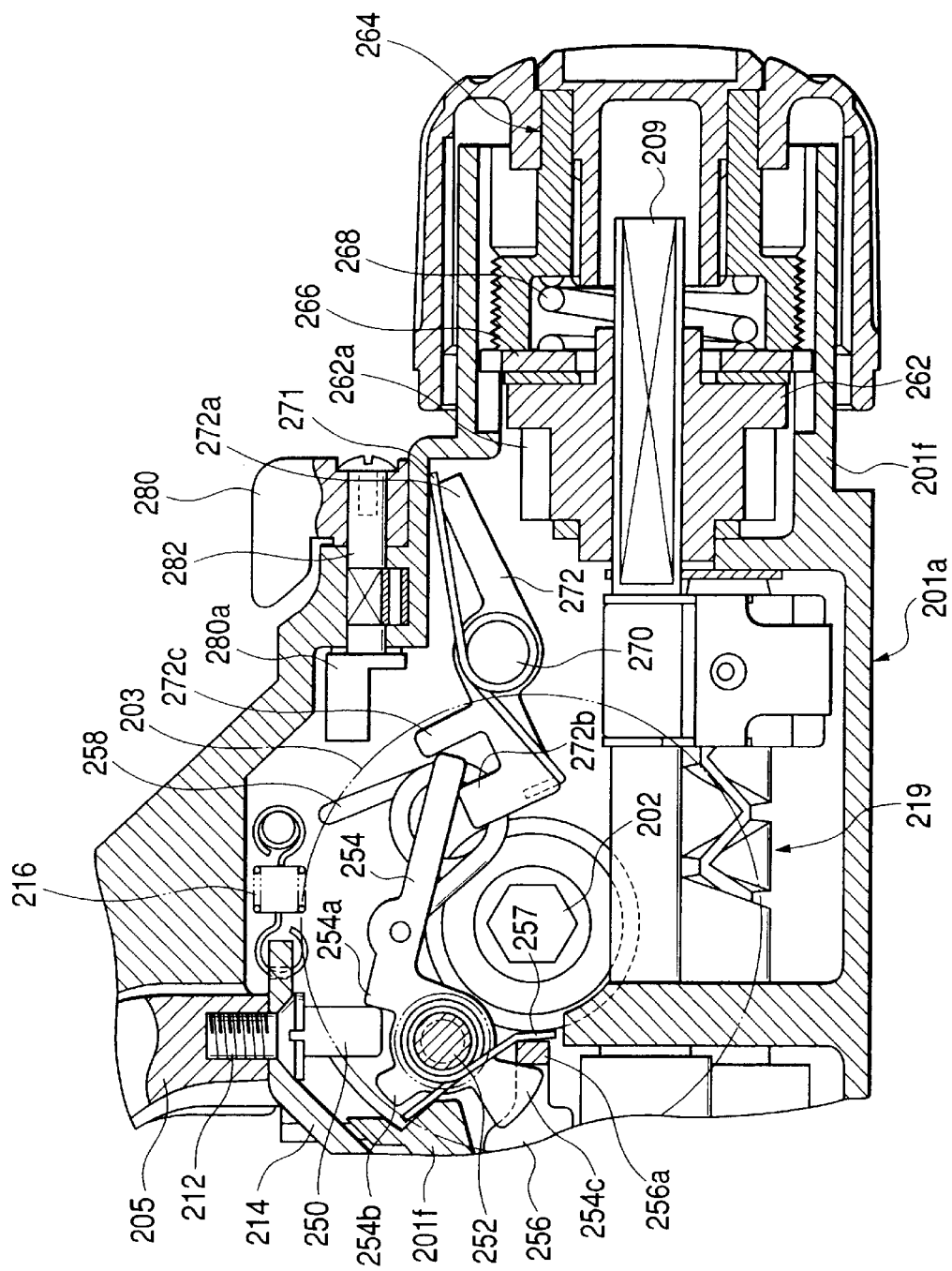
FIG. 18 is a cross-sectional view showing a primary portion of a state in which a change-over lever is held at the first position and an operation lever is pushed down.

When the change-over lever 280 is kept at the first position and the operation lever 205 is pushed down in direction A as shown in FIG. 18, the control cam 254 is rotated clockwise in the drawing via the operating member 250. Due to the foregoing, the engaging claw 256 coming into contact with the third contacting section 254c is moved toward the anti-reverse plate 233B, and the engaging claw 256 is engaged with the engaging groove 233a of the anti-reverse plate 233B, so that the brake rotor 231 can be prevented from rotating as shown in FIG. 12. Even if the pinion gear 213 is going to be reversed under the above condition, since the brake rotor 231, which is directly connected with the pinion gear 213 via the one-way clutch 220, is prevented from rotating, the pinion gear 213 can not be reversed, that is, the rotor 208 can not be reversed. Of course, when the pinion gear 213 is normally rotated under the above condition, the brake rotor 231 and the pinion gear 213, which have been directly connected with each other via the one-way clutch 220, can be released from each other. Therefore, the rotor 208 can be normally rotated.

The control cam 254 rotating according to the operation of pushing down the operation lever 205 comes into contact with the first contacting section 272b of the engaging member 272 and rotates the engaging member 272 counterclockwise in the drawing, so that engagement of the engaging section 272a with the engaging groove 262a can be released. Accordingly, the pressure contacting member 262, spool shaft 209 and spool 210 can be integrally rotated by a set drag force. That is, it is possible to set the spinning reel at the drag state in which the spool 210 can be given a resistance force (brake force) by the rear drag mechanism.

In this connection, when the operation lever 205 is returned to the initial position, the control cam 254 is rotated counterclockwise by the operating member 250 and the straddled spring 258, the engaging claw 256 coming into contact with the third contacting section 254c of the control cam 254 is returned to the initial position while resisting an urging force of the spring 257 as shown in FIG. 10. Due to the foregoing, the engaging groove 233a of the anti-reverse plate 233B and the engaging claw 256 are disengaged from each other, so that the brake rotor 231 can be rotated. When the control cam 254 is rotated counterclockwise, the engaging member 272 is also rotated clockwise by an urging force of the spring 271, and the engaging section 272a is engaged with the engaging groove 262a. That is, the spinning reel is set at the non-drag state.

Figure 19:
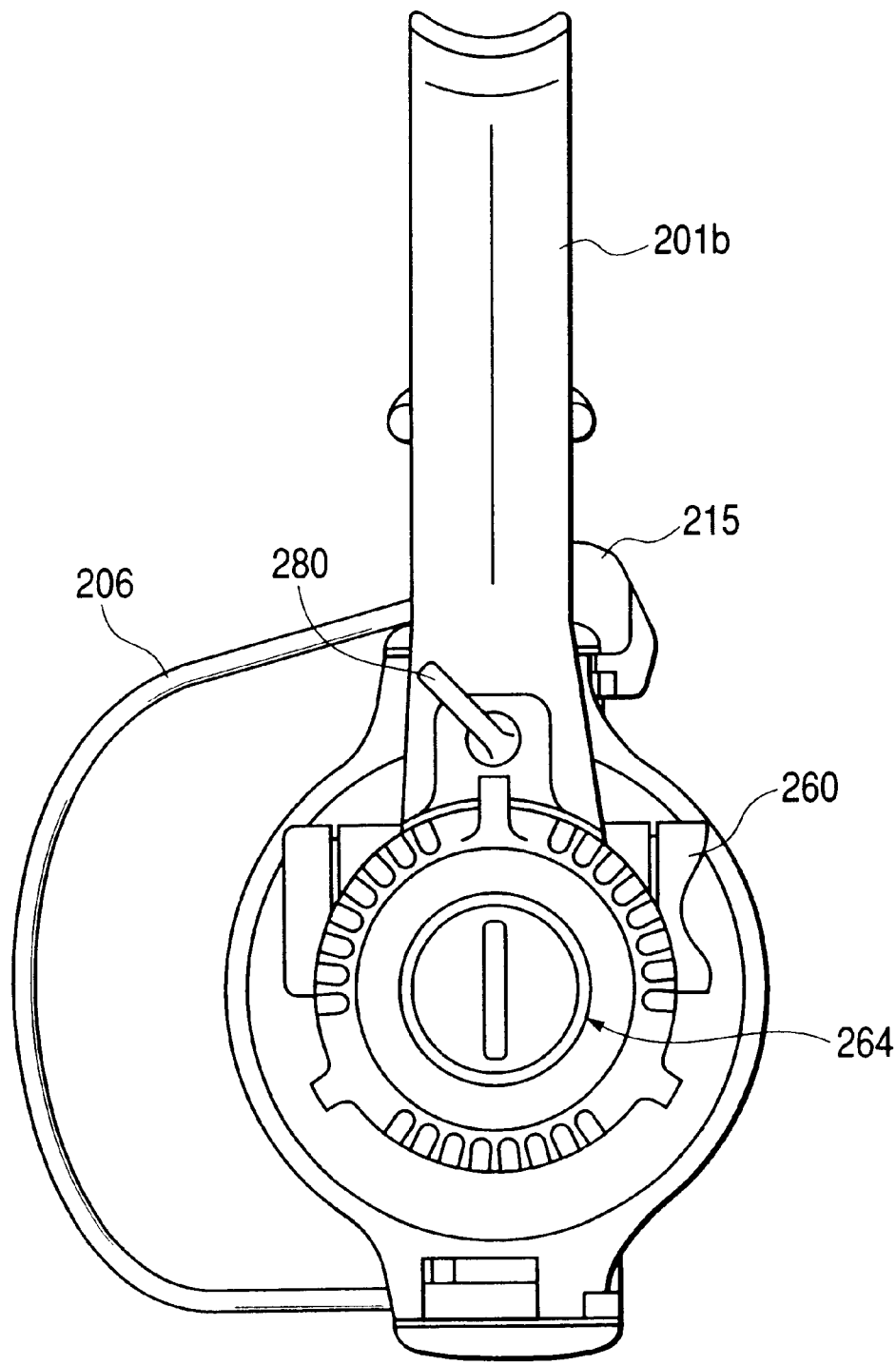
FIG. 19 is a rear view of a reel body in the case where a change-over lever is changed over to the second position.

Next, explanations will be made into a case in which the change-over lever 280 is kept at the second position shown in FIG. 19.

Figure 20:
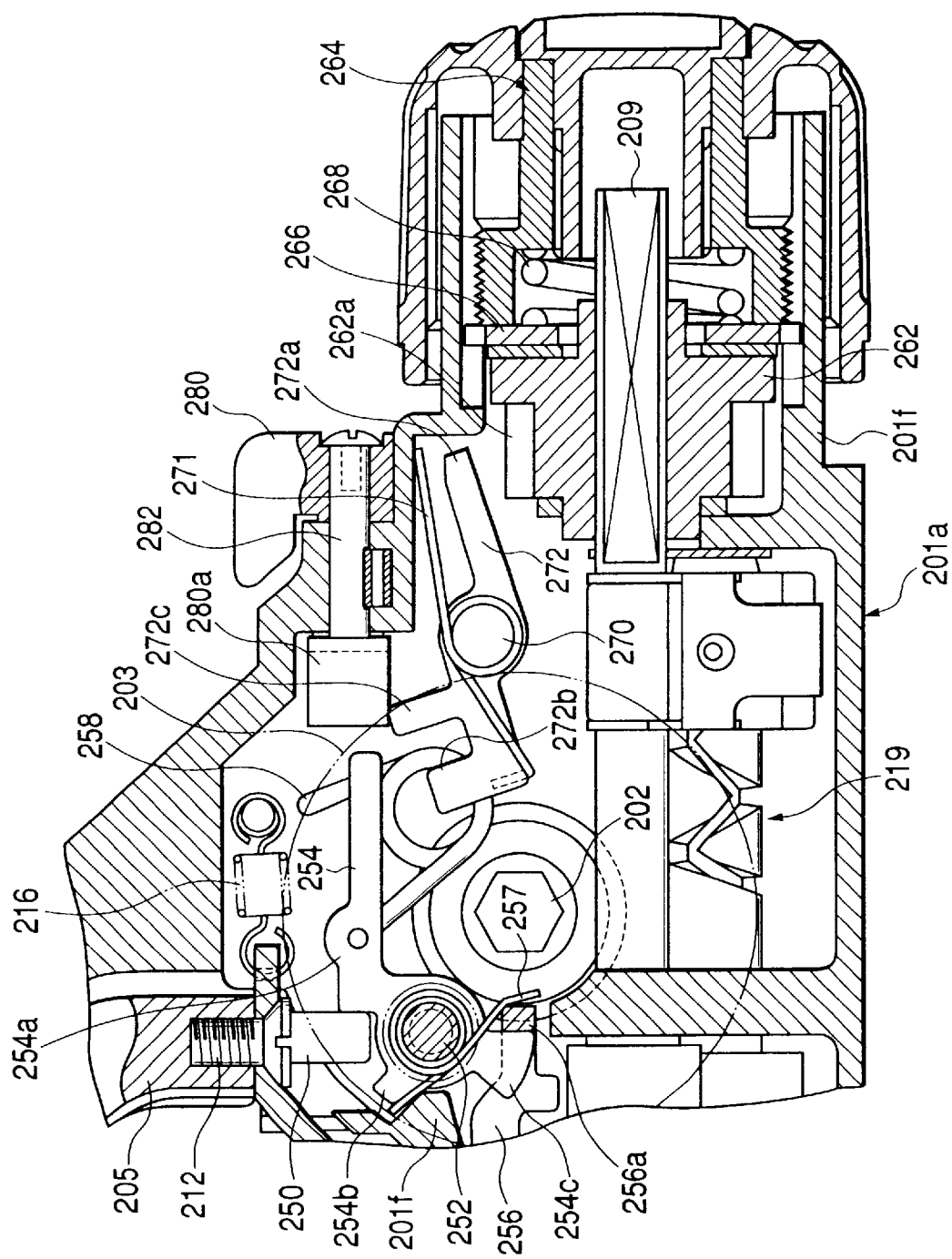
FIG. 20 is a cross-sectional view showing a primary portion of a state in which a change-over lever is held at the second position and an operation lever is held at the initial position.

When the change-over lever 280 is kept at the second position, the pushing section 280a of the change-over lever 280 comes into contact with the second contacting section 272c of the engaging member 272 composing the change-over mechanism. Therefore, the engaging member 272 is rotated in a direction so that the engaging section 272a and the engaging groove 262a can be disengaged from each other while resisting the pushing force of the spring 271 as shown in FIG. 20. Accordingly, the pressure contacting member 262, spool shaft 209 and spool 210 can be integrally rotated by a set drag force. That is, the spinning reel is set at the drag state in which the spool 210 can be given a resistance force (brake force) by the drag mechanism.

In the above state, the drag state can be kept even in the case in which the operation lever 205 is pushed up in direction B so that a brake force can be given to the reverse rotation of the rotor 208 and also even in the case in which the operation lever 205 is pushed down in direction A so that the reverse rotation of the rotor 208 can be prevented. That is, as long as the change-over lever 280 is not returned to the first position, the drag function is exerted at all times. When the reverse rotation of the rotor 208 is prevented, that is, when the operation lever 205 is pushed down in direction A, the spinning reel can be kept in the drag state irrespective of the position of the change-over lever 280.

As explained above, the spinning reel 201 of this embodiment is set at the drag state at all times when the reverse rotation of the rotor 208 is prevented. In other words, in the case of non-drag state, the spinning reel is set at a state in which the rotor 208 can be reversed at all times. Accordingly, a force given to the fishline can be released at all times by the rotation of at least one of the rotor 208 and the spool 210. Accordingly, it is possible to prevent the fishline from cutting off and also it is possible to prevent a fish body from being damaged when the fishline is suddenly pulled by the fish.

In general, in the case where the fishline is suddenly pulled by a fish while the operation lever 205 is being pushed down in direction A and the reverse rotation of the rotor 208 is being prevented, it is important that the fishline is quickly and smoothly drawn out so as to prevent the fishline, which is directly connected with the hook, from cutting off. Especially when the fishline directly connected with a hook is thin, the fishline must be drawn out immediately. However, actually, there is a time lag from the bite of a fish to the complete change-over of the rotor 208 to the reverse rotation, that is, there is a time lag from the bite of a fish to the returning motion of the operation lever 205 conducted by the angler to the initial position shown in FIG. 10. In this time lag, the tackle can not withstand a force given by the fish. Accordingly, there is a possibility that the fishline directly connected with the hook is cut off or the fish body is damaged. Even if the time lag is short and the rotor 208 can be immediately changed over to a state of reverse rotation, when the rotor 208 is suddenly reversed under the condition that tension is given to the fishline, there is a possibility that the fish unhooks and also there is a possibility that backlash is caused in the fishline.

However, according to the spinning reel 201 of this embodiment, in the period of time from the time of completion of change-over of the operation lever 205 to the time at which the rotor 208 can be reversed, the tension given to the fishline can be released by utilizing the drag mechanism. Therefore, the occurrence of the above problems can be avoided. That is, operation is conducted as follows. In the state in which the rotor is prevented from reversing, the spinning reel is set at the drag state at all times. Therefore, in the case where the fishline is suddenly pulled by a fish in the state in which the rotor is prevented from reversing, a force given to the fishline is released by the rotation of the spool 210 while the operation lever 205 is changed over and the rotor 208 can be reversed, that is, the fishline is drawn out from the spool 210, and when the operation lever 205 is returned to the initial position and the rotor 208 can be reversed, the operation lever 205 is operated in direction B by the angler so that the control mechanism can be exerted. In this way, the fishing operation can be carried out. When a fish is caught in the state in which the reverse rotation is prevented, the occurrence of problems caused by the time lag is prevented by utilizing the drag, and while the fishline is being drawn out when the drag is exerted, the state in which the reverse rotation of the rotor 208 is prevented is released by the operation lever 205. Due to the above operation, it is possible to smoothly transfer from the state in which the fishline is drawn out by the spool 210 to the state of braking in which the reversing rotor 208 is given a brake force. Therefore, the body of a caught fish is not damaged and the caught fish can be taken in without causing any trouble. When drag mechanism is used, it is possible to avoid the occurrence of a case in which the rotor 208 is suddenly reversed while the fishline is being given tension. Therefore, the occurrence of backlash of the fishline can be prevented. If the change-over lever 280 is set at the first position when the braking operation is given to the reverse rotation of the rotor 208, the spinning reel is set at the non-drag state. Therefore, it is possible to prevent the occurrence of a case in which the fishline is drawn out by the rotation of the spool 210 although the braking operation is given to the rotor 208 so as to prevent the fishline from being drawn out.

Of course, even if the operation lever 205 is pushed up in direction B so that the braking operation can be given to the reverse rotation of the rotor 208, when the change-over lever 280 is changed over to the second position, the spinning reel can be set at the drag state. That is, the operating state of the drag mechanism can be changed over when necessary. In other words, the operating state of the drag mechanism can be changed over according to a state of fishing, and also the operating state of the drag mechanism can be changed over according to a level of fishing.

As described above, the spinning reel 201 for fishing of this embodiment includes not only a braking mechanism and anti-reverse mechanism but also a drag mechanism and change-over mechanism for changing over the operation of this drag mechanism. Further, the spinning reel 201 for fishing of this embodiment includes a change-over lever 280 for operating the change-over mechanism differently from the operation lever 205 for operating the control mechanism and anti-reverse mechanism. Furthermore, the change-over mechanism can be also operated by the operation lever 205, that is, the change-over mechanism can be operated being linked with the anti-reverse mechanism. Therefore, the rotating condition of the rotor 208 and the rotating condition of the spool 210 can be simply and smoothly changed over, and the fishline can be quickly and smoothly drawn out when a force is suddenly given to the fishline by a fish. Therefore, the spinning reel of this embodiment can cope with various circumstances of fishing.

Sixth Embodiment

Figure 21:
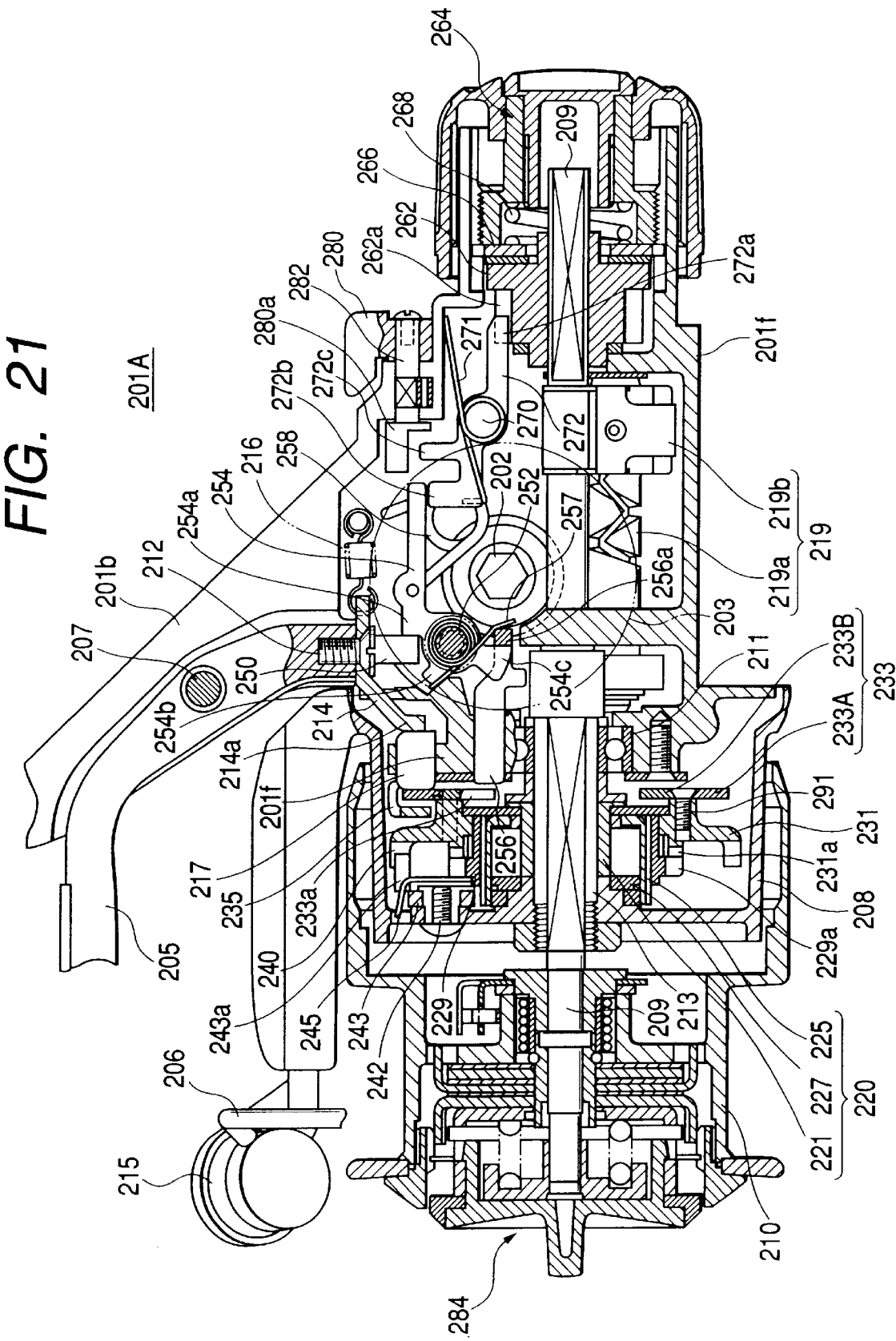
FIG. 21 is an enlarged cross-sectional view showing a spinning reel of the sixth embodiment of the present invention.

FIG. 21 is a view showing the sixth embodiment of the present invention. In this connection, like reference characters are used to indicate like parts in the first and the fifth embodiment, and the explanations are omitted here.

As shown in the drawing, the spinning reel 201A for fishing of this embodiment includes a well known front drag 284, and the spool 210 is pivotally attached to the spool shaft 209. That is, when the fastening condition of the front drag 284 is adjusted, the spool 210 can be rotated with respect to the spool shaft 209 by the thus adjusted drag force. Of course, when the front drag 284 is tightly fastened, the spool 210 can be attached to the spool shaft 209 in such a manner that the spool 210 can not be rotated with respect to the spool shaft 209 like the first embodiment. Other points of structure of the second embodiment are the same as those of the first embodiment.

Consequently, according to the above structure of this embodiment, when the fastening condition of the front drag 284 is adjusted so that the spool 210 can be rotated with respect to the spool shaft 209 by a predetermined force, the change-over mechanism functions as a mechanism for changing over an intensity of the drag force rather than a mechanism for changing over the drag mechanism between the drag state and the non-drag state.

That is, when the drag force on the front drag 284 side is strongly set, that is, when the drag is tightly fastened and at the same time the drag force on the rear drag side is weakly set, that is, when the drag adjusting knob 264 is lightly fastened, if the change-over lever 280 is kept at the first position and the operation lever 205 is kept at the initial position (the situation is the same in a case in which the operation lever 205 is pushed up in direction B), the spool shaft 209 is prevented from rotating, however, the spool 210 can be rotated with respect to the spool shaft 209 by a predetermined force. This state is the non-operation state of rear drag, and at the same time this state is the operation state of front drag (the strong drag state or the spinning reel having a usual front drag). Therefore, the spool 210 can be rotated when a force exceeding a strong drag force, which has been set on the front drag 284 side, is given. That is, it is possible to make a state in which the front drag is activated while the braking operation is conducted on the reverse rotation of the rotor 208, that is, it is possible to make a strong braking state.

On the other hand, when the operation lever 205 is pushed down in direction A, the reverse rotation of the rotor 208 is prevented, and the rotation of the spool shaft 209 is allowed. Therefore, it is possible for the spool 210 to be rotated by a weak drag force which has been set on the rear drag side, that is, when a force exceeding a weak drag force which has been set on the rear drag side is given, the spool 210 can be immediately rotated. When the change-over lever 280 is changed over to the second position, the spool 210 can be rotated at all times by a weak drag force which has been set on the rear drag side irrespective of the operation of the operation lever 205. That is, it is possible to make a state in which the rear drag is activated while the braking operation is conducted on the reverse rotation of the rotor 208, that is, it is possible to make a weak braking state. This state is the operation state of rear drag, that is, this state is a weak drag state.

As described above, the spinning reel 201 for fishing of this embodiment includes not only a braking mechanism and anti-reverse mechanism but also a drag mechanism and change-over mechanism for changing over this drag mechanism. Further, the spinning reel 201 for fishing of this embodiment includes a change-over lever 280 for operating the change-over mechanism differently from the operation lever 205 for operating the control mechanism and anti-reverse mechanism. Furthermore, the change-over mechanism can be also operated by the operation lever 205, that is, the change-over mechanism can be operated being linked with the anti-reverse mechanism. Therefore, the rotating condition of the rotor 208 and the rotating condition of the spool 210 can be simply and smoothly changed over, and the fishline can be quickly and smoothly drawn out when a force is suddenly given to the fishline. Therefore, the spinning reel of this embodiment can cope with various circumstances of fishing. That is, it is possible for the second embodiment to provide the same effect as that of the first embodiment, and further the second embodiment can provide a wider operation state than the first embodiment.

Seventh Embodiment

Figure 22:
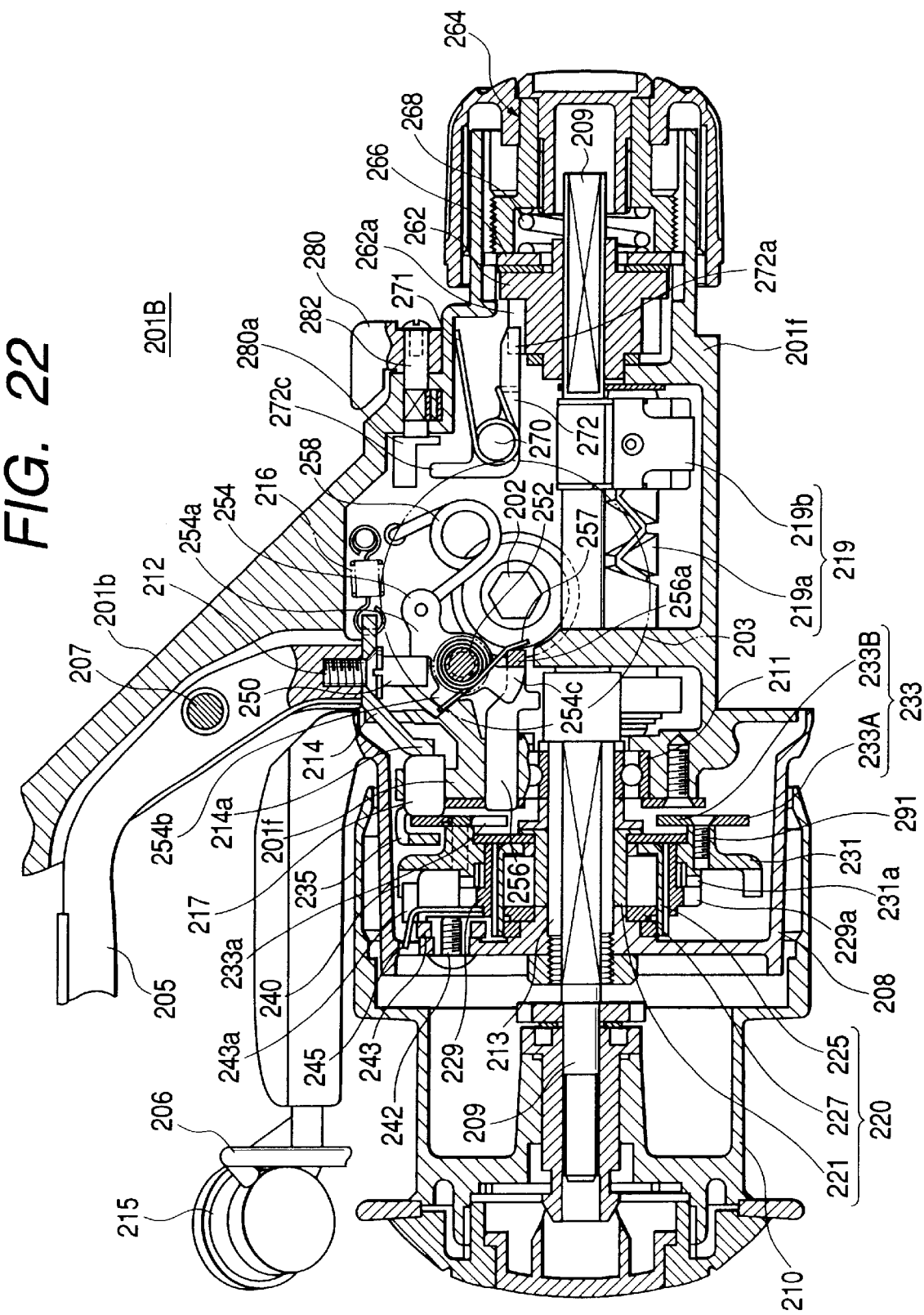
FIG. 22 is an enlarged cross-sectional view showing a spinning reel of the seventh embodiment. of the present invention.

FIG. 22 is a view showing the seventh embodiment of the present invention. In this connection, like reference characters are used to indicate like parts in the fifth embodiment, and the explanations are omitted here.

As shown in the drawing, in the spinning reel 201B for fishing of this embodiment, the first contacting section 272b is not provided in the engaging member 272. Accordingly, the extending section coming into contact with the first contacting section 272b is not provided in the control cam 254. That is, the change-over mechanism is not operated being linked with the anti-reverse mechanism, and the change-over mechanism is operated only by the change-over lever 280. Other points of the structure of the third embodiment are the same as those of the first embodiment.

Accordingly, in the above structure, the drag mechanism can be changed over between operation and non-operation by operating the change-over lever 280 irrespective of the operation of the operation lever 205.

As described above, the spinning reel 201B for fishing of this embodiment includes: a control mechanism, a anti-reverse mechanism, a drag mechanism, and a change-over mechanism for changing over the drag mechanism between operation and non-operation. The spinning reel 201B for fishing of this embodiment further includes: a change-over lever 280 for operating the change-over mechanism differently from the operation lever 205 for operating the control mechanism and the anti-reverse mechanism. Accordingly, it is possible to simply and smoothly change over the rotation of the rotor 208 and that of the spool 210. Even when the fishline is suddenly pulled by a fish, it is possible to quickly and smoothly draw out the fishline so as to cope with various circumstances.

Eighth Embodiment

Figure 23:
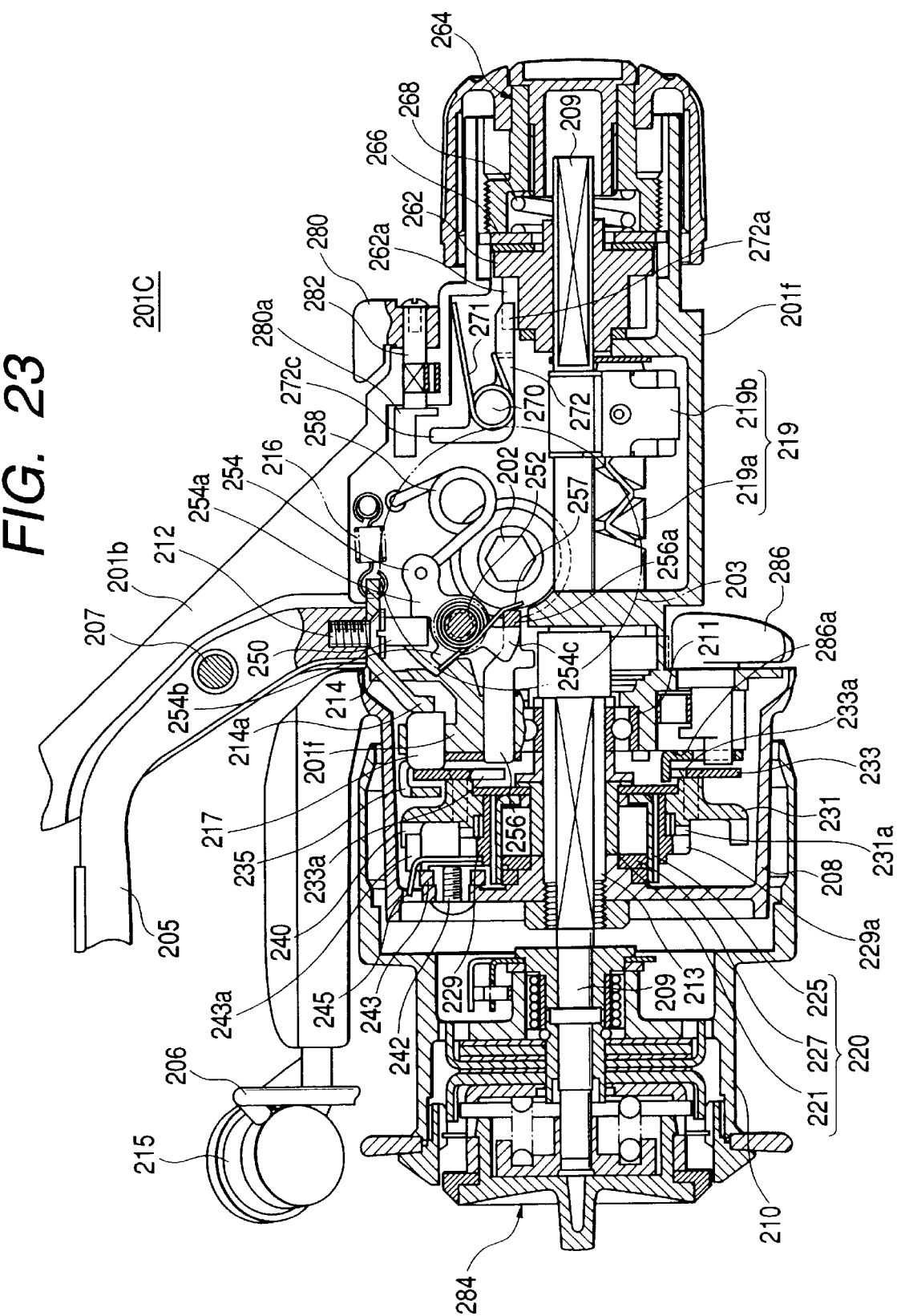
FIG. 23 is an enlarged cross-sectional view showing a spinning reel of the eighth embodiment of the present invention.

FIG. 23 is a view showing the eighth embodiment of the present invention. In this connection, like reference characters are used to indicate like parts in the fifth and the seventh embodiment, and the explanations are omitted here.

As shown in the drawing, in the spinning reel 201C for fishing of this embodiment, the first contacting section 272b is not provided in the engaging member 272. Accordingly, the extending section coming into contact with the first contacting section 272b is not provided in the control cam 254. That is, the change-over mechanism is not operated being linked with the anti-reverse mechanism, and the change-over mechanism is operated only by the change-over lever 280.

The spinning reel 201C for fishing of this embodiment includes a well known front drag 284, and the spool 210 is pivotally attached to the spool shaft 209. That is, when the fastening condition of the front drag 284 is adjusted, the spool 210 can be rotated with respect to the spool shaft 209 by the thus adjusted drag force. Of course, when the front drag 284 is tightly fastened, the spool 210 can be attached to the spool shaft 209 in such a manner that the spool 210 can not be rotated with respect to the spool shaft 209 like the first embodiment.

The spinning reel 201C for fishing of this embodiment includes a lever member 286 for changing over the rotor 208 between a state in which reverse rotation is prevented and a state in which reverse rotation is allowed, and this lever member 286 is provided differently from the operation lever 205. Specifically, the lever member 286 includes a claw 286a capable of engaging with the engaging groove 233a of the brake member 233. When the lever member 286 is rotated in one direction, the claw 286a is engaged with the engaging groove 233a, and the rotor 208 can be prevented from reversing irrespective of the operation of the operation lever 205. When the lever 286 is rotated in another direction, the claw 286a and the engaging groove 233a are disengaged from each other. Therefore, the rotation of the rotor 208 can be changed over only by the operation of the operation lever 205. Other points of the structure are the same as those of the first embodiment.

Accordingly, in the above structure, it is possible to change over an intensity of the drag force by the operation of the change-over lever 280 irrespective of the operation of the operation lever 205. Especially, in this embodiment, the front drag can be activated under the condition that the reverse rotation of the rotor 208 is prevented, of course, the rear drag can be activated, too. When the lever member 286 is operated without operating the operation lever 205 under the condition that the rotor is allowed to reverse, the rotor 208 is changed over to a state in which the rotor 208 is prevented from reversing. Accordingly, the spinning reel for fishing can be quickly transferred to a spool controlling state controlled by the front drag 284 or rear drag according to a change in the circumstance of a fishing place.

As described above, the spinning reel 201C for fishing of this embodiment includes: a control mechanism, a anti-reverse mechanism, a drag mechanism, and a change-over mechanism for changing over an intensity of the drag force. The spinning reel 201C for fishing of this embodiment further includes: a change-over lever 280 for operating the change-over mechanism differently from the operation lever 205 for operating the control mechanism and the anti-reverse mechanism, and a lever member 286 for preventing the rotor 208 from reversing. Accordingly, it is possible to simply and smoothly change over the rotation of the rotor 208 and that of the spool 210. Even when the fishline is suddenly pulled by a fish, it is possible to quickly and smoothly draw out the fishline so as to cope with various circumstances.

Ninth Embodiment

Figure 24:
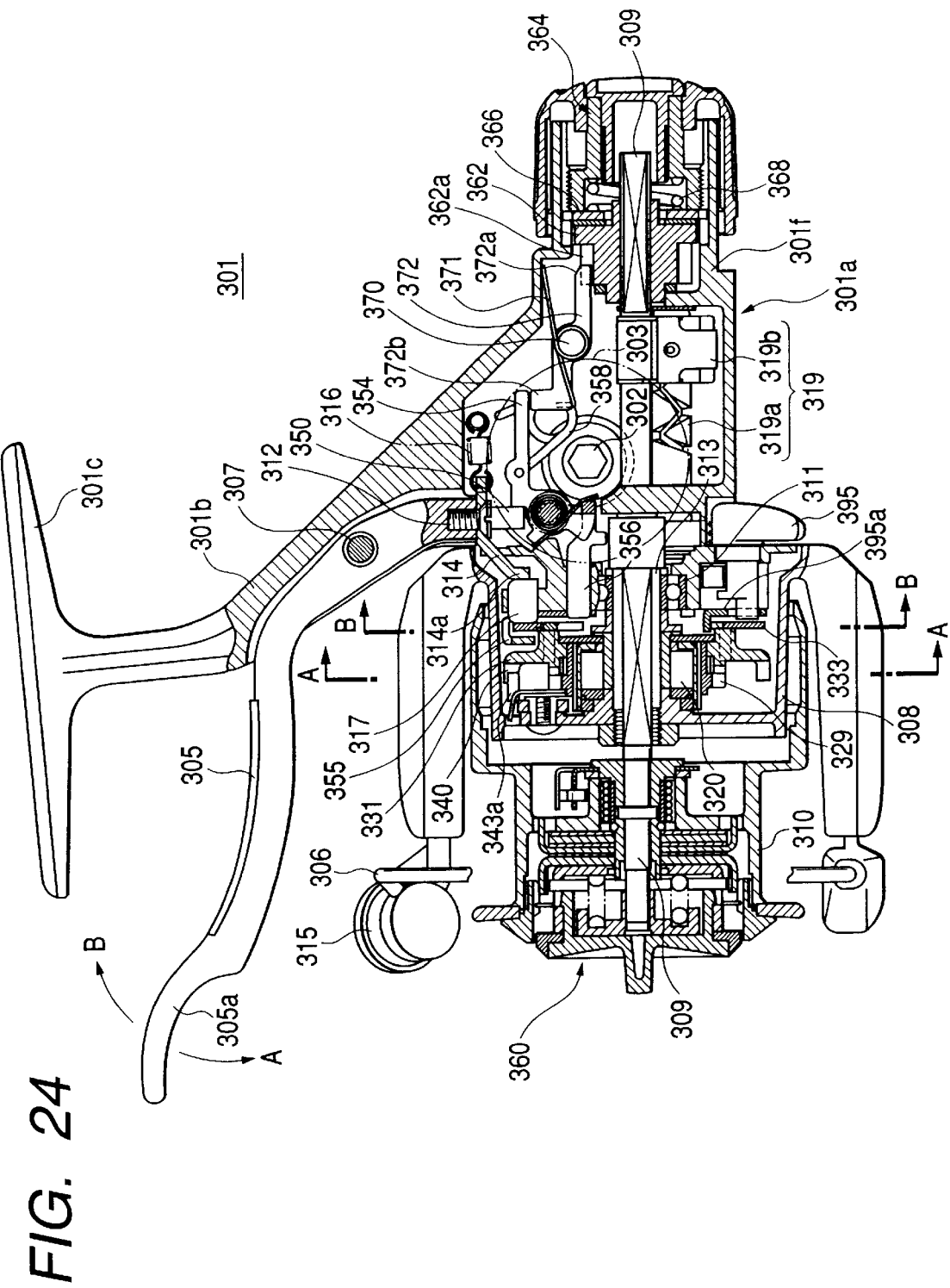
FIG. 24 is a cross-sectional view showing a spinning reel of the ninth embodiment of the present invention.
Figure 25:
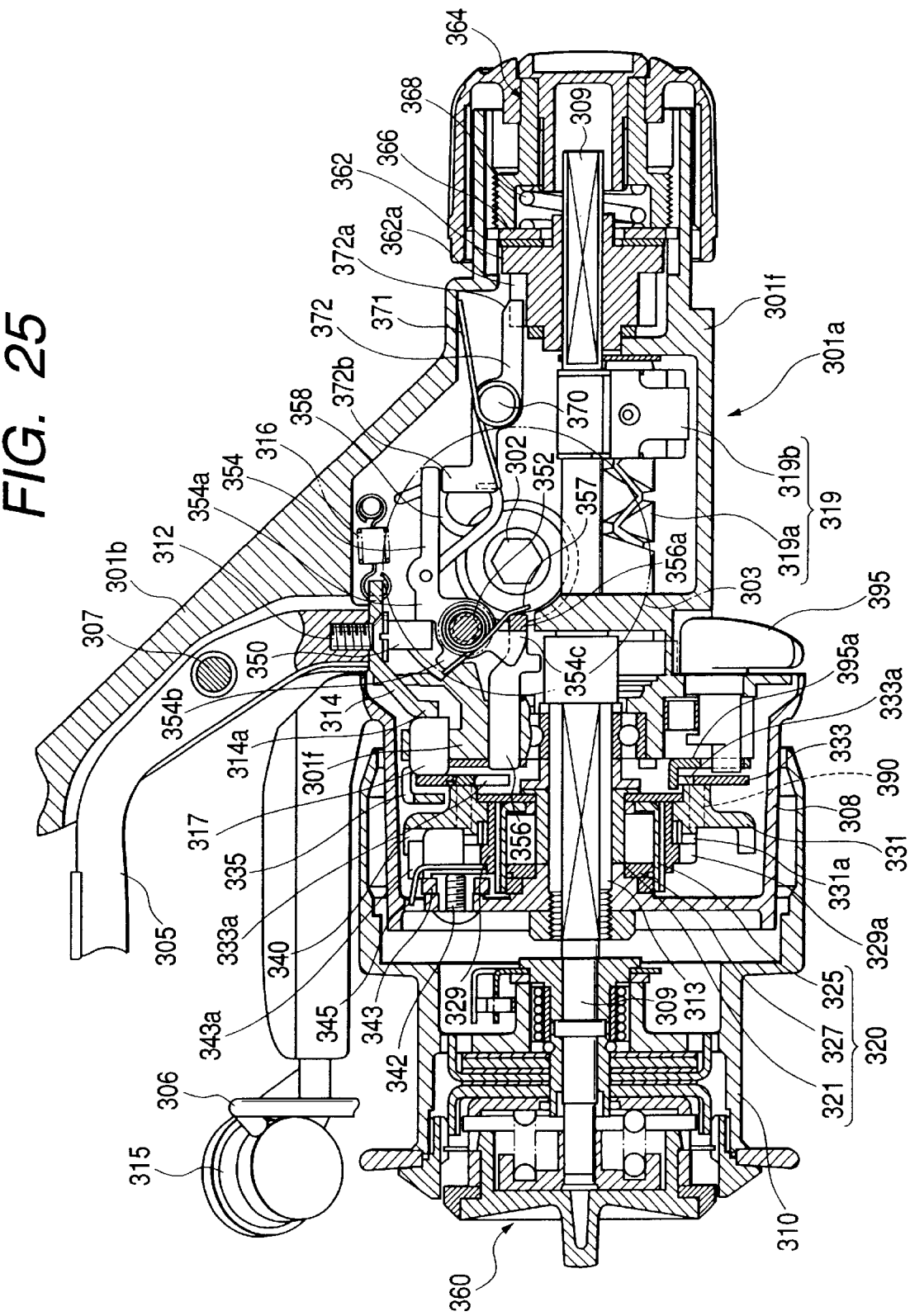
FIG. 25 is an enlarged cross-sectional view showing the spinning reel of FIG. 24.

As shown in FIGS. 24 and 25, the spinning reel 301 for fishing of this embodiment includes: a reel body 301a; a leg portion 301b extending from the reel body 301a; and a fishing rod attaching portion 301c formed at an end section of the leg portion 301b, attached to a fishing rod not shown in the drawing. In the reel body 301a, a handle shaft 302 is pivotally provided. The handle not shown is fixed to an end section of the handle shaft 302 protruding from the reel body 301a.

The drive gear 303 is attached to the handle shaft 302. This drive gear 303 is engaged with the pinion gear 313 which is arranged in a direction perpendicular to the handle shaft 302 and pivotally supported via the bearing 311. The rotor 308 having the bail 306 and the fishline guide device 315 is integrally attached to an end section of the pinion gear 313.

The spool shaft 309, which can be slid in a direction perpendicular to the handle shaft 302 and pivotally supported, is inserted into the pinion gear 313. The spool 310 round which the fishline is wound is fixed to an end section of the spool shaft 309, wherein the spool 310 can be rotated with respect to the spool shaft 309. In this case, when the well known front drag 360 is tightly fastened, the spool 310 can be fixed to the spool shaft 309 in such a manner that the spool 310 can not be rotated with respect to the spool shaft 309. That is, the spool 310 can be rotated integrally with the spool shaft 309.

The oscillating mechanism 319 is engaged with the drive gear 303. This oscillating mechanism 319 includes: a worm shaft 319a engaged and rotated with the drive gear 303; and a slider 319b engaged with a groove of the worm shaft 319a, wherein the slider 319b can not be moved with respect to the spool shaft 309 in the axial direction. When the handle shaft 302 is rotated by the rotation of the handle 360, the spool shaft 309 is reciprocated in the axial direction.

In the above structure, when the handle is rotated so as to rotate the handle shaft 302, the spool 310 attached to the spool shaft 309 via the oscillating mechanism 319 is reciprocated in the longitudinal direction, and the rotor 308 is rotated via the drive gear 303 and the pinion gear 313. Accordingly, the fishline is uniformly wound round the spool 310 via the fishline guide device 315.

The reel body 301a includes: a brake mechanism for giving a brake force to the reverse rotation of the rotor 308; and a anti-reverse mechanism for preventing the reverse rotation of the rotor 308. These mechanisms are operated by the operation lever 305 which is an operation member pivotally attached to the leg portion 301b via the support shaft 307. The operating portion 305a, at which an angler's finger is hooked, is formed at one end section of the operation lever 305. The pushing plate 314 is attached to the other end section of the operation lever 305 located at a position in the reel body 301a via the screw 312. The pushing section 314a for pushing the brake shoe 317 of the brake mechanism described later is formed at an end section of the pushing plate 314.

In this connection, as described later, when the operation lever 305 is pushed up in direction B from the initial position shown in FIG. 24, the brake shoe 317 is pushed by the pushing section 314a so that the brake mechanism is activated. When the operation lever 305 is pushed down in direction A from the initial position, the anti-reverse mechanism is activated. Between the pushing plate 314 and the reel body 301a, there is provided a tension spring 316 for holding the operation lever 305 at the initial position at all times. Accordingly, when the operation force given to the operation lever 305 is released after the operation lever 305 has been pushed up in direction B (clockwise) round the support shaft 307, the operation lever 305 is returned to the initial position by a pushing force of the spring 316.

The brake mechanism for giving a brake force to the reverse rotation of the rotor include: a brake rotor (rotational body) 331 attached to the pinion gear 313 via the one-way clutch 320; a ring-shaped brake body 333 attached onto a surface of the brake rotor 331. The brake body 333 is attached onto a surface of the brake rotor 331 via the screw 390. The pressure-contact piece 335, which is arranged crossing the brake body 333, is supported by the frame 301f of the reel body 301a. For example, the wooden brake shoe 317, which slides on and comes into pressure contact with the brake body 333, is movably held by the frame 301f.

Figure 26:
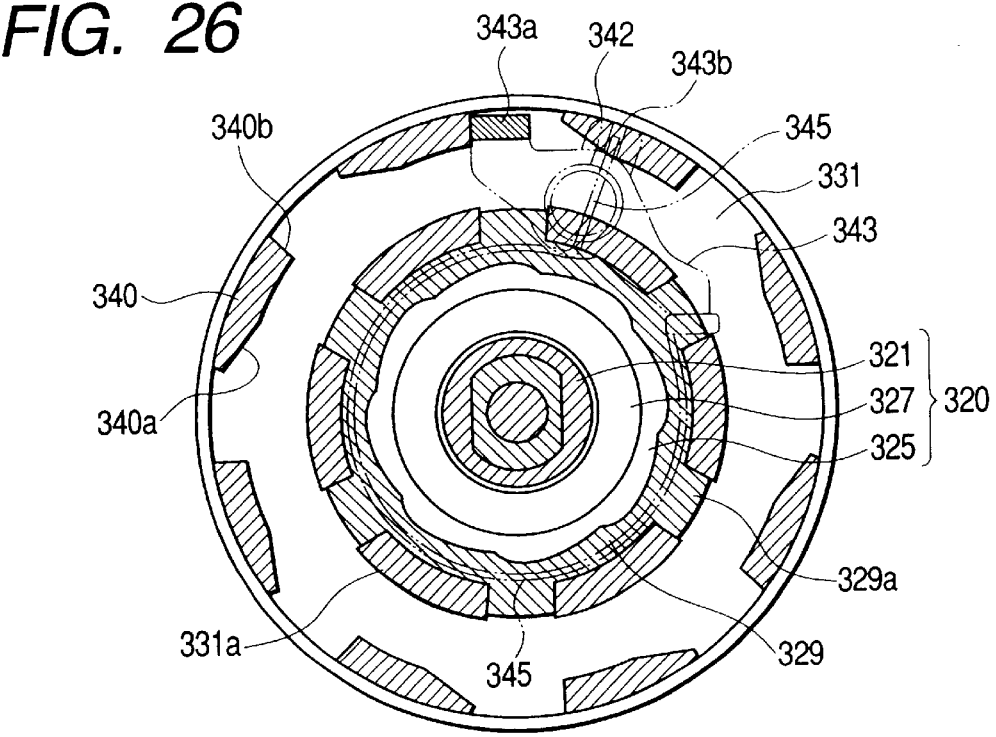
FIG. 26 is a cross-sectional view taken on line A—A in FIG. 24 in the case of reverse rotation of a rotor.
Figure 27:
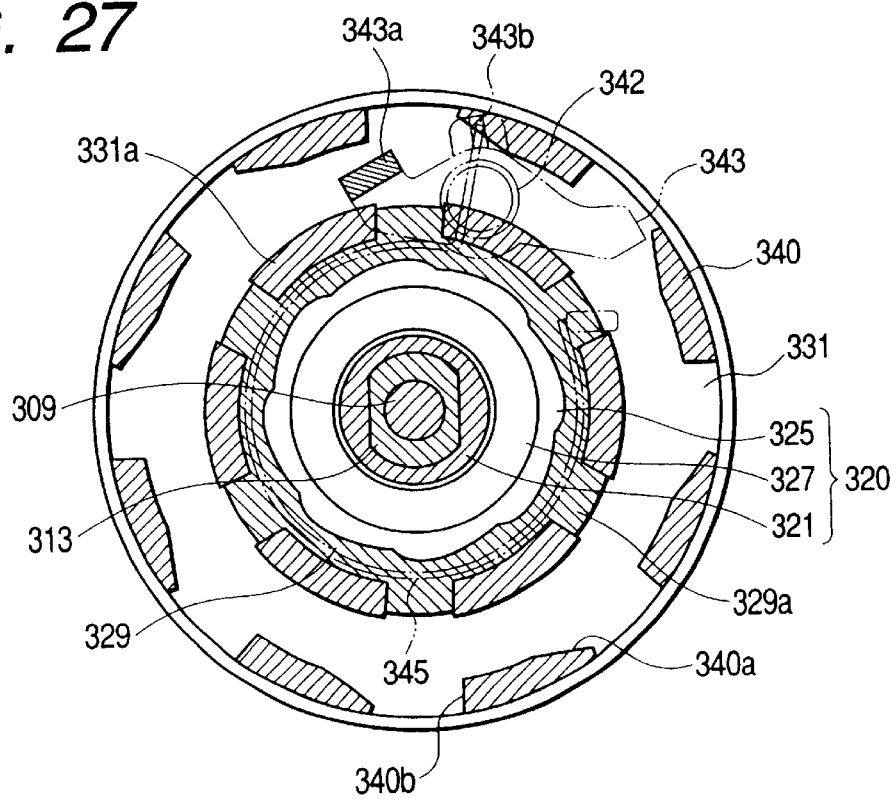
FIG. 27 is a cross-sectional view taken on line A—A in FIG. 24 in the case of normal rotation of a rotor.
Figure 28:
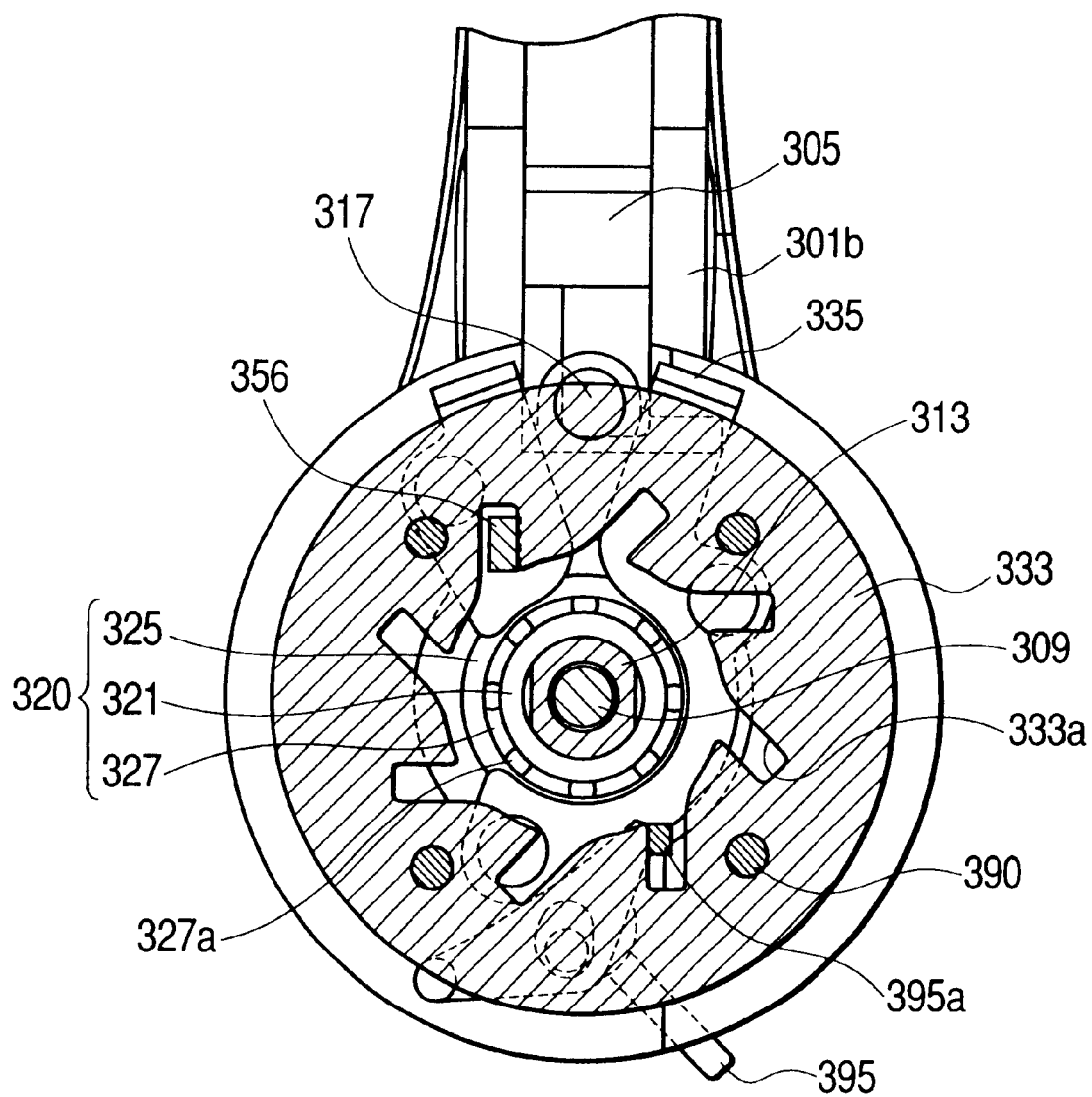
FIG. 28 is a cross-sectional view taken on line B—B in FIG. 24 when a claw of a lever member is engaged with an engaging groove of a brake body.
Figure 29:
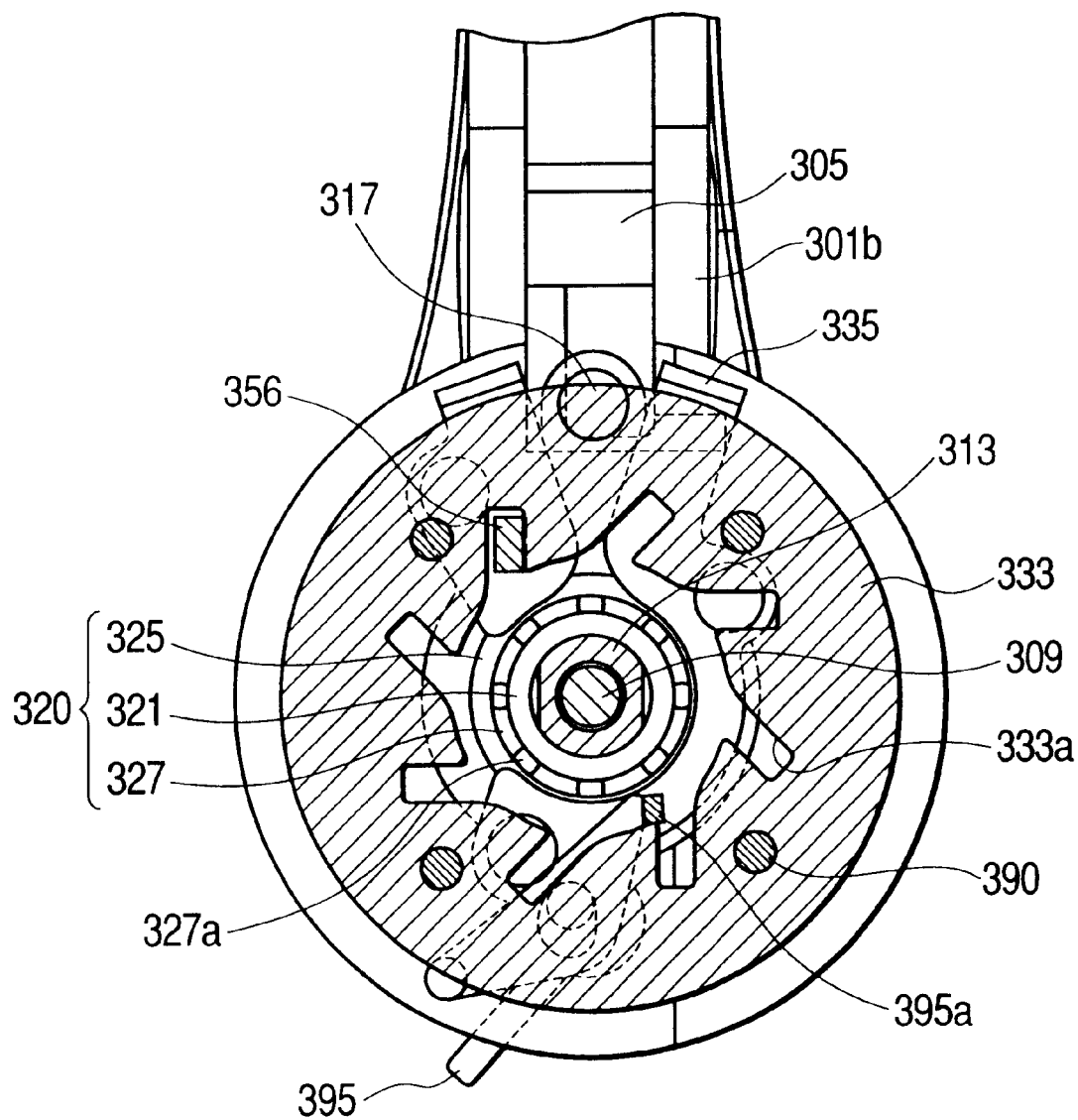
FIG. 29 is a cross-sectional view taken on line B—B in FIG. 24 when a claw of a lever member is disengaged from an engaging groove of a brake body.
Figure 30:
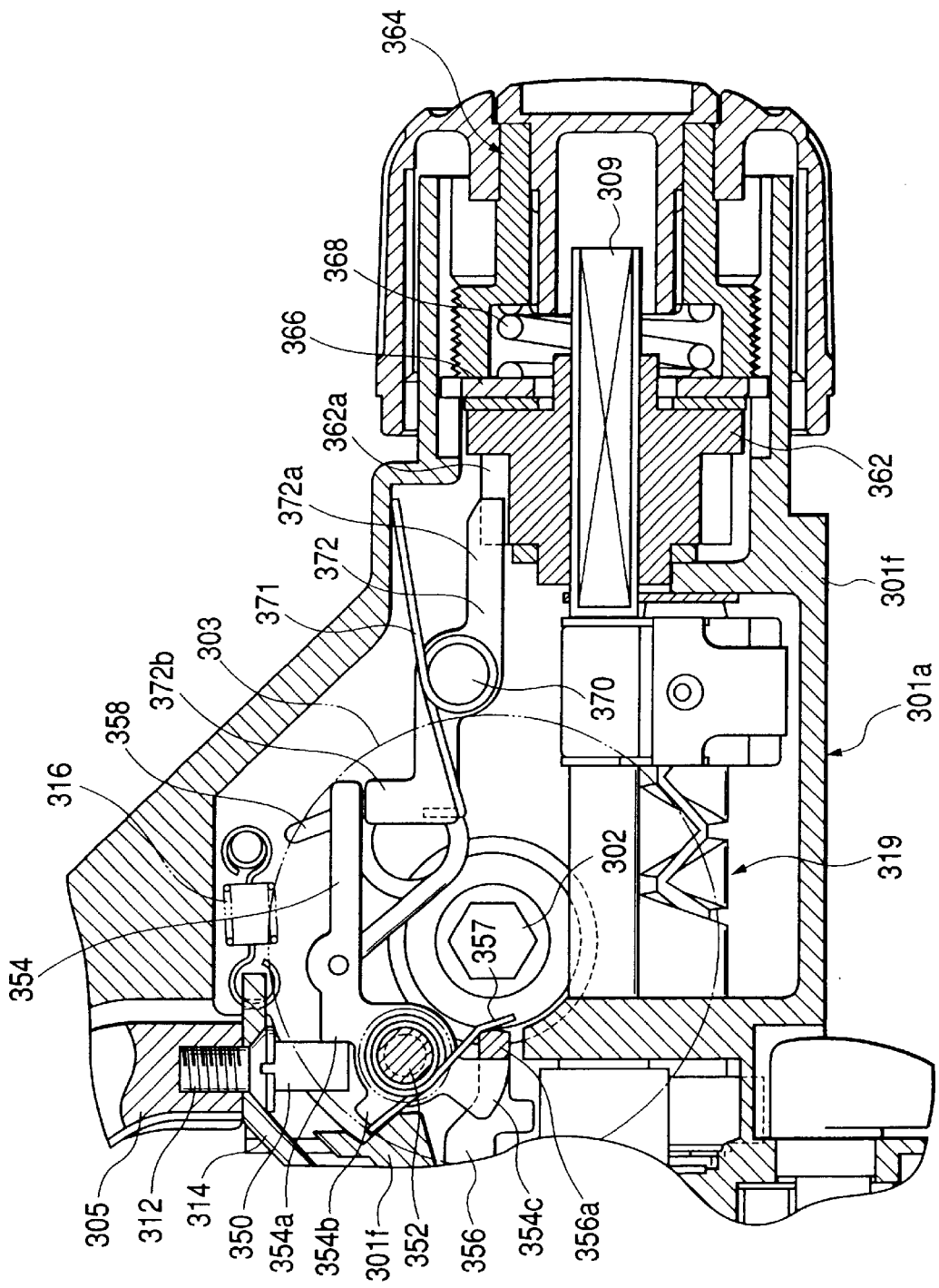
FIG. 30 is a cross-sectional view showing a primary portion of a state in which an operation lever is held at the initial position.

As shown in FIGS. 26 to 29 in detail, the one-way clutch 320 includes: an inner ring 321 engaged with the pinion gear 313 so that the inner ring 321 can not be rotated with respect to the pinion gear 313; a retainer 327 arranged outside the inner ring 321; and outer ring 325 arranged outside the retainer 327. The retainer 327 retains a plurality of rolling members 327a as shown in FIGS. 28 and 29. Each rolling member 327a is pushed in one direction by a spring member provided in the retainer 327. On the inner circumferential face of the outer ring 325, there are provided a free rotating region in which each rolling member 327a can be freely rotated and a wedge region in which each rolling member 327a can not be rotated. The one-way clutch 320 composed as described above is operated as follows. When the inner ring 321 is normally rotated together with the pinion gear 313, that is, when the rotor 308 is rotated in the direction of winding the fishline, the rolling members 327a of the retainer 327 are located in the free rotating region of the outer ring 325, so that the torque of the inner ring 321 can not be transmitted to the outer ring 325. However, when the inner ring 321 is reversed together with the pinion gear 313, that is, when the rotor 308 is rotated in the direction of drawing out the fishline, the rolling members 327a of the retainer 327 are located in the wedge region of the outer ring 325, so that the torque of the inner ring 321 can be transmitted to the outer ring 325.

The retaining body 329 is press-fitted onto the outer circumference of the outer ring 325. The brake rotor 331 is engaged with the outer circumference of the retaining body 329 in such a manner that the brake rotor 331 can not be rotated. Specifically, a plurality of protrusions 329a, protruding in the radial direction, which are arranged at regular intervals in the circumferential direction of the retaining body 329, are formed in the outer circumferential face of the retaining body 329. Each of a plurality of extending sections 31a, which respectively extend from the brake rotor 331 in the axial direction of the spool shaft 309, is engaged between the protrusions 329a, 329a. That is, the brake rotor 331 is engaged with the retaining body 329 being incapable of rotating when the protrusions 329a and the extending sections 331a are engaged with each other, and the brake rotor 331 can be moved only in the axial direction with respect to the retaining body 329.

When a pushing force given to the brake rotor 331 by the operation lever 305 via the brake shoe 317 is released, the brake rotor 331 is moved in the axial direction by a pushing force of a spring not shown along the retaining body 329. Therefore, the brake rotor 331 is returned to the initial position shown in FIG. 24.

According to the above connecting structure in which the pinion gear 313 and the brake rotor 331 are connected with each other via the one-way clutch 320, only when the pinion gear 313 is reversed, the brake rotor 331 and the retaining body 329 are directly connected with the pinion gear 313 (rotor 308) via the one-way clutch 320 and rotated integrally with the rotor 308.

In the peripheral edge section of the brake rotor 331, there are provided a plurality of engaging protrusions 340, for example, eight pieces of engaging protrusions 340 are arranged at regular intervals in the circumferential direction. In each engaging protrusion 340, there are provided a tapered face 340a for guiding the engaging claw 343a into a clearance between the engaging protrusions 340 when the rotor 308 is reversed and a stopper face 340b coming into contact with the engaging claw 343a located in the clearance between the engaging protrusions 340.

On the other hand, by the rotor 308, the rotational member 343 is pivotally supported via the pin 342 toward the brake rotor 331. At one end of the rotational member 343, there is provided an engaging claw 343a capable of engaging with the clearance between the engaging protrusions 340. In the rotor 308, there are provided two bosses for restricting the rotation of the rotational member 343 in various directions, and these two bosses are formed toward the brake rotor 331. In the rotational member 343, there is provided a U-shaped groove 343b. Into this groove 343b, an end section of the leaf spring 345, which is wound round the retaining body 329, is fixed.

As shown in the enlarged view of FIG. 25, the anti-reverse for preventing the reverse rotation of the rotor 308 includes: an operating member 350 protruding from the other end section of the operation lever 305 or the pushing plate 314; a control cam 354 pivotally supported by the support shaft 352 and rotated by the operating member 350; an engaging claw 356 movably held by the frame 301f of the reel body 301a and moved by the rotation of the control cam 354 toward the brake body 333; and a plurality of engaging grooves 333a formed on the inner circumferential face of the brake body 333 and engaged with the engaging claw 356. The control cam 354 includes: a first a second contacting section 354a, 354b coming into contact with the operating member 350; and a third contacting section 354c coming into contact with the engaging claw 356. The operating member 350 is located between the first and the second contacting section 354a, 354b. The third contacting section 354c comes into contact with the protrusion 356a protruding from the end section of the engaging claw 356 to the side. The control cam 354 is pushed in the rotational direction at all times by the straddled spring 358 arranged between the control cam 354 and the reel body 301a. The engaging claw 356 is pushed in the direction so that the engaging claw 356 can be engaged with the engaging groove 333a of the anti-reverse plate 333B by the spring 357 wound round the support shaft 352.

In the above structure, in the case where the operation lever 305 is located at the initial position shown in FIG. 24, the first contacting section 354a of the control cam 354 comes into contact with the operation body 350 by a pushing force of the straddled spring 358. In this case, the pushing force of the straddled spring 358 acts in a direction so that the control cam 354 can be rotated counterclockwise in the drawing. At the same time, the third contacting section 354c coming into contact with the protrusion 356a of the engaging claw 356 resists a pushing force of the spring 357, and the engaging claw 356 is separated from the anti-reverse plate 333B. When the operation lever 305 is pushed down from the initial position in direction A, the operating member 350 resists a pushing force of the straddled spring 358, and the control cam 354 is rotated clockwise in the drawing. At this time, the straddled spring 358 is oscillated in accordance with the rotation of the control cam 354. When the straddled spring 358 exceeds its dead point, the straddled spring 358 gives a pushing force to the control cam 354 in a direction so that the control cam 354 can be rotated clockwise. Accordingly, after that, the control cam 354 is rotated clockwise by not the operating member 350 but the pushing force of the straddled spring 358. Due to the foregoing, the first contacting section 354a is separated from the operating member 350, and at the same time the engaging claw 356 coming into contact with the third contacting section 354c is moved toward the anti-reverse plate 333B. Then, the engaging claw 356 is engaged with the engaging groove 333a of the brake body 333, and when the second contacting section 354b comes into contact with the operating member 350, the control cam 354 stops rotating. That is, the engagement of the engaging groove 333a with the engaging claw 356 is kept, and the operation lever 305 is kept at the rotor anti-reverse position that the operation lever 35 is pushed down in direction A.

In the spinning reel 301 of this embodiment, there is provided a drag mechanism of the rear drag type in which the spool 310 is allowed to rotate in the fishline drawing direction, that is, the torque of the spool is controlled, while the spool 310 is being given a brake force. As shown in FIGS. 24 and 25, this drag mechanism includes: a substantially cylindrical member 362 attached to the spool shaft 309 and contacted with the frame 301f of the reel body 301a with pressure; a drag adjusting knob 364 arranged at the rear of the reel body 301a and screwed to the frame 301f of the reel body 301a; a plurality of frictional plates 366 arranged between the pressure contacting member 362 and the drag adjusting knob 364; and a compression spring 368 interposed between the frictional plate 366 and the drag adjusting knob 364. In this case, the pressure contacting member 362 is attached to the spool shaft 309 in such a manner that the press contact member 362 can not be rotated with respect to the spool shaft 309, that is, the press contact member 362 is rotated integrally with the spool shaft 309, and at the same time the press contact member 362 can be moved in the axial direction relatively with the spool shaft 309. On the outer circumferential face of the pressure contacting member 362, there are provided a plurality of engaging grooves 362a engaged with the engaging member 372 of the change-over mechanism described later.

In the above drag mechanism, the drag adjusting knob 364 is fastened while resisting a pushing force of the spring 368, that is, the drag adjusting knob 364 is screwed into the frame 301f. Then, the press contact member 362 comes into pressure contact with the frame 301f of the reel body 301a via the frictional plate 366 by the pushing force corresponding to the fastening force, so that the rotation of the spool shaft 309 can be restricted. Accordingly, the rotation of the spool shaft 310 rotating integrally with the spool shaft 309 can be restricted. When the drag adjusting knob 364 is loosened, the rotation of the spool shaft 309 can be allowed, that is, the rotation of the spool 310 can be allowed according to the looseness of the drag adjusting knob 364.

In the spinning reel 301 of this embodiment, there is provided a change-over mechanism for changing over a state of operation of the above drag mechanism. This change-over mechanism is operated by the operation lever 305. This change-over mechanism changes over between a drag state in which the drag mechanism can give a resistance force (brake force) to the rotation of the spool 310 and a non-drag state in which the rotation of the spool 310 is stopped so that the drag function can not be exerted.

Specifically, the change-over mechanism is provided with an engaging member 372 pivotally attached to the support shaft 370. This engaging member 372 has an engaging section 372a engaged with the engaging groove 362a of the press contact member 362 composing the drag mechanism. The engaging member 372 is pushed at all times by the spring 371 wound round the support shaft 370 in a rotational direction so that the engaging section 372a can be engaged with the engaging groove 362a. On the opposite side to the engaging section 372a with respect to the support shaft 370, the engaging member 372 includes: a contacting portion 372b capable of contacting with the control cam 354 composing the anti-reverse mechanism.

The spinning reel 301 for fishing of this embodiment includes a lever member 395, which is a anti-reverse member, for changing over the rotor 308 between a state in which reverse rotation is prevented and a state in which reverse rotation is allowed, and this lever member 386 is provided differently from the operation lever 305. Specifically, the lever member 386 includes a claw 395a capable of engaging with the engaging groove 333a of the brake body 333. When the lever member 386 is rotated in one direction and located at the first position, the claw 386a is engaged with the engaging groove 333a as shown in FIGS. 24, 25 and 28, and the rotor 308 can be prevented from reversing irrespective of the operation of the operation lever 305. When the lever 386 is rotated in another direction and located at the second position, the claw 386a and the engaging groove 333a are disengaged from each other as shown in FIG. 29. Therefore, the rotation of the rotor 308 can be changed over only by the operation of the operation lever 305.

Next, operation of the above spinning reel 301 will be explained as follows.

First, explanations will be made into a case in which the lever member 395 is held at the second position and the claw 395a is disengaged from the engaging groove 333a of the brake body 333. When the operation lever 305 is held at the initial position in the above condition as shown in FIGS. 24, 25, 29 and 30, the control cam 354 is pushed by the straddled spring 358 and its first contacting section 354a comes into contact with the operating member 350 and the control cam 354 is separated from the first contacting portion 372b of the engaging member 372. Therefore, the engaging member 372 can not rotate the control cam 354. Accordingly, the engaging section 372a of the engaging member 372 is kept in a state in which the engaging section 372a of the engaging member 372 is engaged with the engaging groove 362a of the pressure contacting member 362 composing the drag mechanism by a pushing force of the spring 371.

Accordingly, the rotation of the press contact member 362 is prevented, and the rotation of the spool shaft 309 engaged with the pressure contacting section 362 is restricted. That is, the rotation of the spool 310, which is attached to the spool shaft 309 being incapable of rotating, is prevented. In this way, the device is set in the non-drag state in which the drag function is not exerted.

When the pinion gear 313 is normally rotated via the handle in the above state, the rotor 308 attached to the pinion gear 313 is also normally rotated being integrated with the pinion gear 313, that is, the rotor 308 attached to the pinion gear 313 is rotated in the fishline winding direction. However, the brake rotor 331 is not rotated by the connecting action of the one-way clutch 320 at this time. The rotational member 343, which is supported by the rotor 308 and normally rotated together with the rotor 308, is given a force in the reverse rotational direction by the action of the leaf spring 345, so that the rotational member 343 is rotated round the pin 342, and one end portion of the rotational member 343 collides with the boss of the rotor 308, and the engaging claw 343a is retracted inside so that it can be separated from the engaging protrusion 340 of the brake rotor 331 as shown in FIG. 27. Accordingly, the rotational member 343 is freely rotated in the normal direction together with the rotor 308 while the rotational member 343 is not restricted by the brake rotor 331. Therefore, even when the operation lever 305 is pushed up in direction B in the above condition and the brake body 333 is pinched between the brake shoe 317 and the pressure contacting piece 335, the rotor is not given a brake force at all. In this case, the brake rotor 331 is moved in the axial direction along the retaining body 329 by a pushing force of the brake shoe 317. In this case, that is, in the case where the operation lever 305 is pushed up in direction B, the control cam 354 is not activated. Therefore, engagement of the engaging section 372a with the engaging groove 362a can be kept, that is, the non-drag state can be kept.

When the pinion gear 313 is reversed while the change-over lever 380 is being kept at the first position and the operation lever 305 is being kept at the initial position, the rotor 308 attached to the pinion gear 313 is reversed integrally with the pinion gear 313, that is, the rotor 308 attached to the pinion gear 313 is rotated in the fishline drawing direction. At this time, the brake rotor 331 is also reversed together with the rotor 308 by the connecting action of the one-way clutch 320. Accordingly, when the operation lever 305 is pushed up in direction B in the above condition, the brake plate 333A is pinched between the brake shoe 317 and the pressure contacting piece 335. When the brake is applied to the brake rotor 331, a brake force corresponding to an amount of rotation of the operation lever 305 can act on the rotor 308, which rotates integrally with the brake rotor 331, via the one-way clutch without generating any time lag. In this case, a brake force given to the brake rotor 331 and a torque of the rotor 308 act in the opposite direction to each other in the wedge region of the outer ring 325 of the one-way clutch 320. However, if these forces are in an allowable load range of the one-way clutch 320, the rotor 308 and the brake rotor 331 are not rotated to each other. That is, even in the case of braking operation, the rotor 308 and the brake rotor 331 are rotated integrally with each other. Accordingly, the engaging claw 343a of the rotational member 343 rotating integrally with the rotor 308 is not engaged with the brake rotor 331, and all torque of the rotor 308 is received by the one-way clutch 320, for example, a force drawn by a fish is received by the one-way clutch 320. However, when the force acting in the wedge region of the outer ring 325 exceeds the allowable load of the one-way clutch 320, that is, when the torque of the rotor 308 and the braking force acting on the brake rotor 331 exceed the allowable load of the one-way clutch 320, the one-way clutch 320 slips, and the rotor 308 starts rotating with respect to the brake rotor 331. Due to the foregoing, the rotational member 343, which is reversed integrally with the rotor 308, is given a force in the direction of normal rotation by the action of the leaf spring 345. Therefore, the rotational member 343 is rotated round the pin 342, and its one end portion collides with the boss of the rotor 308, and the engaging claw 343a protrudes between the engaging protrusions 340 of the brake rotor 331 as shown in FIG. 26. As a result, the rotor 308 is engaged with the brake rotor 331, and they are reversed being integrated with each other. Therefore, after that, a brake force acting on the brake rotor 331 directly acts on the rotor 308 without being transmitted via the one-way clutch 320. Accordingly, all torque of the rotor can be received by the brake rotor 331, for example, all force drawn by a fish can be received by the brake rotor 331.

Figure 31:
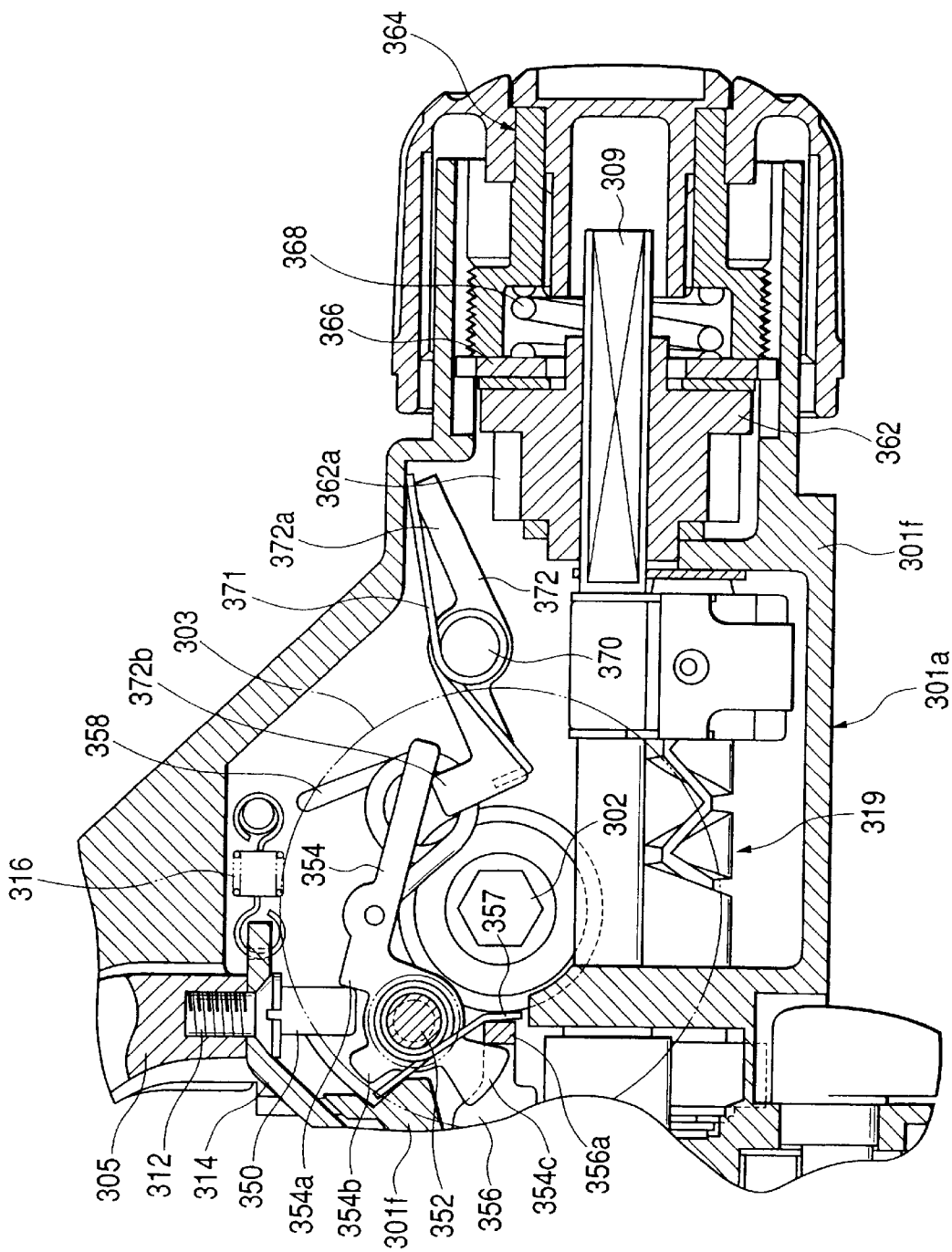
FIG. 31 is a cross-sectional view showing a primary portion of a state in which an operation lever is pushed down.

When the operation lever 305 is pushed down in direction A as shown in FIG. 31, the control cam 354 is rotated clockwise in the drawing via the operating member 350. Due to the foregoing, the engaging claw 356 coming into contact with the third contacting section 354c is moved toward the brake body 333, and the engaging claw 356 is engaged with the engaging groove 333a of the brake body 333, so that the brake rotor 331 can be prevented from rotating as shown in FIG. 26. Even if the pinion gear 313 is going to be reversed under the above condition, since the brake rotor 331, which is directly connected with the pinion gear 313 via the one-way clutch 320, is prevented from rotating, the pinion gear 313 can not be reversed, that is, the rotor 308 can not be reversed. Of course, when the pinion gear 313 is normally rotated under the above condition, the brake rotor 331 and the pinion gear 313, which have been directly connected with each other via the one-way clutch 320, can be released from each other. Therefore, the rotor 308 can be normally rotated.

The control cam 354 rotating according to the operation of pushing down the operation lever 305 comes into contact with the contacting portion 372b of the engaging member 372 and rotates the engaging member 372 counterclockwise in the drawing, so that engagement of the engaging section 372a with the engaging groove 362a can be released. Accordingly, the press contact member 362, spool shaft 309 and spool 310 can be integrally rotated by a set drag force. That is, it is possible to set the spinning reel at the drag state in which the spool 310 can be given a resistance force (brake force) by the drag mechanism.

In this connection, when the operation lever 305 is returned to the initial position, the control cam 354 is rotated counterclockwise by the operating member 350 and the straddled spring 358, and the engaging claw 356 coming into contact with the third contacting section 354c of the control cam 354 is returned to the initial position while resisting a pushing force of the spring 357 as shown in FIG. 24. Due to the foregoing, the engaging groove 333a of the anti-reverse plate 333B and the engaging claw 356 are disengaged from each other, so that the brake rotor 331 can be rotated. When the control cam 354 is rotated counterclockwise, the engaging member 372 is also rotated clockwise by a pushing force of the spring 371, and the engaging section 372a is engaged with the engaging groove 362a. That is, the spinning reel is set at the non-drag state.

As explained above, as long as the lever member 395 is kept at the second position, the spinning reel 301 of this embodiment is set at the drag state at all times under the condition that the reverse rotation of the rotor 308 is prevented. In other words, in the case of non-drag state, the spinning reel is set at a state in which the rotor 308 can be reversed at all times. Accordingly, a force given to the fishline can be released at all times by the rotation of at least one of the rotor 308 and the spool 310. Accordingly, it is possible to prevent the fishline from cutting off and also it is possible to prevent a fish body from being damaged when the fishline is suddenly pulled by the fish.

In general, in the case where the fishline is suddenly pulled by a fish while the operation lever 305 is being pushed down in direction A and the reverse rotation of the rotor 308 is being prevented, it is important that the fishline is quickly and smoothly drawn out so as to prevent the fishline, which is directly connected with the hook, from cutting off. Especially when the fishline directly connected with a hook is thin, the fishline must be drawn out immediately. However, actually, there is a time lag from the bite of a fish to the complete change-over of the rotor 308 to the reverse rotation, that is, there is a time lag from the bite of a fish to the returning motion of the operation lever 305 conducted by the angler to the initial position shown in FIG. 24. In this time lag, the tackle can not withstand a force given by the fish. Accordingly, there is a possibility that the fishline directly connected with the hook is cut off or the fish body is damaged. Even if the time lag is short and the rotor 308 can be immediately changed over to a state of reverse rotation, when the rotor 308 is suddenly reversed under the condition that tension is given to the fishline, there is a possibility that the fish unhooks and also there is a possibility that backlash is caused in the fishline.

However, according to the spinning reel 301 of this embodiment, in the period of time from the time of completion of change-over of the operation lever 305 to the time at which the rotor 308 can be reversed, the tension given to the fishline can be released by utilizing the drag mechanism. Therefore, the occurrence of the above problems can be avoided. That is, operation is conducted as follows. In the state in which the rotor is prevented from reversing, the spinning reel is set at the drag state at all times. Therefore, in the case where the fishline is suddenly pulled by a fish in the state in which the rotor is prevented from reversing, a force given to the fishline is released by the rotation of the spool 310 while the operation lever 305 is changed over and the rotor 308 can be reversed, that is, the fishline is drawn out from the spool 310, and when the operation lever 305 is returned to the initial position and the rotor 308 can be reversed, the operation lever 305 is operated in direction B by the angler so that the control mechanism can be exerted. In this way, the fishing operation can be carried out. When a fish is caught in the state in which the reverse rotation is prevented, the occurrence of problems caused by the time lag is prevented by utilizing the drag, and while the fishline is being drawn out when the drag is exerted, the state in which the reverse rotation of the rotor 308 is prevented is released by the operation lever 305. Due to the above operation, it is possible to smoothly transfer from the state in which the fishline is drawn out by the spool 310 to the state of braking in which the reversing rotor 308 is given a brake force. Therefore, the body of a caught fish is not damaged and the caught fish can be taken in without causing any trouble. When drag mechanism is used, it is possible to avoid the occurrence of a case in which the rotor 308 is suddenly reversed while the fishline is being given tension. Therefore, the occurrence of backlash of the fishline can be prevented. When the braking operation is given to the reverse rotation of the rotor 308, the spinning reel is set at the non-drag state. Therefore, it is possible to prevent the occurrence of a case in which the fishline is drawn out by the rotation of the spool 310 although the braking operation is given to the rotor 308 so as to prevent the fishline from being drawn out.

In this embodiment, the front drag 360 is arranged differently from the rear drag. Consequently, when the fastening condition of the front drag 360 is adjusted so that the spool 310 can be rotated with respect to the spool shaft 309 by a predetermined force, the change-over mechanism functions as a mechanism for changing over an intensity of the drag force rather than a mechanism for changing over the drag mechanism between the drag state and the non-drag state.

That is, when the drag force on the front drag 360 side is strongly set, that is, when the drag is tightly fastened and at the same time the drag force on the rear drag side is weakly set, that is, when the drag adjusting knob 364 is lightly fastened, if the operation lever 305 is kept at the initial position (the situation is the same in a case in which the operation lever 305 is pushed up in direction B), the spool shaft 309 is prevented from rotating, however, the spool 310 can be rotated with respect to the spool shaft 309 by a predetermined force. This state is the non-operation state of rear drag, and at the same time this state is the operation state of front drag (the strong drag state or the spinning reel having a usual front drag). Therefore, the spool 310 can be rotated when a force exceeding a strong drag force, which has been set on the front drag 360 side, is given. That is, it is possible to make a state in which the front drag is activated while the braking operation is conducted on the reverse rotation of the rotor 308.

On the other hand, when the operation lever 305 is pushed down in direction A, the reverse rotation of the rotor 308 is prevented, and the rotation of the spool shaft 309 is allowed. Therefore, it is possible for the spool 310 to be rotated by a weak drag force which has been set on the rear drag side, that is, when a force exceeding a weak drag force which has been set on the rear drag side is given, the spool 310 can be immediately rotated. This state is the operation state of rear drag, that is, this state is a weak drag state.

On the other hand, in the case where the lever member 395 is held at the first position and the claw 395a is engaged with the engaging groove 333a of the brake body 333, the action becomes different from that of the above case. That is, since the reverse rotation of the rotor 308 is prevented at all times irrespective of the operation of the operation lever 305, the operation lever 305 functions only as a change-over lever for changing over an intensity of the drag force or changing over between a state of operation and a state of non-operation of the drag. Therefore, the operation lever 305 does not function as a brake lever for giving a brake force to the reverse rotation of the rotor 308.

As explained above, according to this embodiment, a brake force given to the fishing line when it is drawn out can be controlled in various forms. Therefore, an angler can previously set the brake force according to his preference. That is, it is possible for the angler to change over the brake force among the first state in which the rotor is prevented from reversing only by the change-over of the single operation lever 305 and the drag is set in an operation state (weak drag state), the second state in which the rotor can be reversed and the drag is set in a non-operation state (strong drag state) and the third state in which a brake force can be given to the reverse rotation of the rotor. Accordingly, it is possible for an angler to conduct a change-over operation easily without getting his hand off the handle. Further, only when the lever member 395 is held at the first position, the operation lever 305 can be made to function only as a change-over lever of the drag state.

As explained above, according to the spinning reel for fishing of the present invention, it is possible to simply and smoothly change over the rotation of the rotor and that of the spool. Even when the fishline is suddenly pulled by a fish, it is possible to quickly and smoothly draw out the fishline so as to cope with various circumstances.

What is claimed is:

1. A spinning reel for fishing comprising:

a reel body defining a leg portion attachable to a fishing rod;

a rotor rotatably supported on said reel body;

a spool rotatably attached to said reel body, a fishline being wound around said spool by rotating said rotor;

a first drag mechanism which applies a first resistance to a rotation of said spool;

a change-over mechanism changing over between a state of operation and a state of nonoperation of said first drag mechanism;

an operation member, which operates said change-over mechanism, attached to said leg portion so that said operation member can be operated by a finger of a hand holding said fishing rod; and an anti-reverse mechanism which prevents a reverse rotation of said rotor, wherein said operation member operates said anti-reverse mechanism to change over between a state of operation and a state of no-operation of said anti-reverse mechanism, wherein the operation states of the anti-reverse mechanism are interlocked with the operation states of the change-over mechanism by the operation member.

2. A spinning reel for fishing according to claim 1, wherein said operation member is formed in lever shaped and pivotally attached to said leg portion.

3. A spinning reel for fishing according to claim 1, wherein said rotation of said spool with respect to said reel body is allowed with said first resistance in said state of operation of said first drag mechanism, said rotation of said spool with respect to said reel body is prevented in said state of non-operation of said first drag mechanism.

4. A spinning reel for fishing according to claim 1, wherein said reverse rotation of said rotor is prevented and a normal rotation of said rotor is allowed in said state of operation of said anti-reverse mechanism.

5. A spinning reel for fishing according to claim 4, wherein said operation member operates said first drag mechanism in said state of operation when said operation member operates said anti-reverse mechanism in said state of non-operation.

6. A spinning reel for fishing according to claim 4 further comprising:

a brake mechanism which applies a braking force to said reverse rotation of said rotor, wherein said operation member operates said brake mechanism to change over between a state of operation and a state of non-operation of said brake mechanism.

7. A spinning reel for fishing according to claim 6, wherein said operation member operates said brake mechanism in said state of operation when said operation member controls said anti-reverse mechanism in said state of non-operation.

8. A spinning reel for fishing according to claim 1 further comprising:
a change-over member which operates said anti-reverse mechanism to change over between said state of operation and said state of non-operation of said anti-reverse mechanism.

9. A spinning reel for fishing according to claim 1 further comprising:
a change-over mechanism operating member which operates said change-over mechanism to change over between said state of operation and said state of non-operation of said first drag mechanism.

10. A spinning reel for fishing comprising:
a reel body defining a leg portion attachable to a fishing rod;
a rotor rotatably supported on said reel body;
a spool rotatably attached to said reel body, a fishline being wound around said spool by rotating said rotor;
a first drag mechanism which applies a first resistance to a rotation of said spool;
a change-over mechanism changing over between a state of operation and a state of nonoperation of said first drag mechanism;
an operation member, which operates said change-over mechanism, attached to said leg portion so that said operation member can be operated by a finger of a hand holding said fishing rod;
a spool shaft, one end of said spool shaft attached to a first drag mechanism; and
a second drag mechanism, which applies a second resistance to a rotation of said spool with respect to said spool shaft, attached between the other end of said spool shaft and said spool.

11. A spinning reel for fishing according to claim 10, wherein said second resistance can be set higher than said first resistance.

12. A spinning reel for fishing comprising:
a reel body;
a rotor rotatably supported on said reel body;
a spool rotatably attached to said reel body, a fishline being wound around said spool by rotating said rotor;
a drag mechanism which applies a resistance to a rotation of said spool;
a change-over mechanism changing over between a state of operation and a state of non-operation of said drag mechanism;
a brake mechanism which applies a braking force to a reverse rotation of said rotor;
an anti-reverse mechanism which prevents said reverse rotation of said rotor;
an operation member, which operates said brake mechanism and said anti-reverse mechanism, attached to said reel body; and
a change-over mechanism operating member, which operates said change-over mechanism, provided at said reel body and separated from said operation member.

* * * * *